(12) United States Patent
Rosenthal et al.

(10) Patent No.: US 12,238,565 B2
(45) Date of Patent: Feb. 25, 2025

(54) CLOUD-BASED MANAGEMENT OF HARDWARE COMPLIANCE DATA FOR ACCESS POINT DEVICES

(71) Applicant: Juniper Networks, Inc., Sunnyvale, CA (US)

(72) Inventors: Joshua Rosenthal, San Jose, CA (US); James Jay Friedmann, Canton, OH (US); John James Musante, Holtsville, NY (US); Gurpreet Singh, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 302 days.

(21) Appl. No.: 17/656,405

(22) Filed: Mar. 24, 2022

(65) Prior Publication Data
US 2023/0308928 A1    Sep. 28, 2023

(51) Int. Cl.
*H04W 28/02*    (2009.01)
*H04B 17/11*    (2015.01)
(Continued)

(52) U.S. Cl.
CPC ........ *H04W 28/0215* (2013.01); *H04B 17/11* (2015.01); *H04B 17/21* (2015.01);
(Continued)

(58) Field of Classification Search
CPC ......... H04W 28/0215; H04W 28/0226; H04W 48/04; H04W 84/12; H04W 24/02;
(Continued)

(56) References Cited

U.S. PATENT DOCUMENTS 9,832,082 B2    11/2017    Dade et al.
10,477,507 B2    11/2019    Oerton et al.
(Continued)

FOREIGN PATENT DOCUMENTS

EP    3402249 A1    8/2021

OTHER PUBLICATIONS

Extended Search Report from counterpart European Application No. 22208387.5 dated Aug. 3, 2023, 10 pp.
(Continued)

*Primary Examiner* — Candal Elpenord
(74) *Attorney, Agent, or Firm* — Shumaker & Sieffert, P.A.

(57) ABSTRACT

A plurality of access point (AP) devices configured to provide a wireless network at a site within a geographic region and a management system (NMS) configured to manage the plurality of APs are described. An AP device sends, to the NMS, a message including version information of hardware compliance data currently stored at the AP device. The NMS determines, based on the version information, whether the first version of the hardware compliance data stored at the AP device is in compliance with applicable regulations of the geographic region. When the first version is not in compliance, the AP device receives, from the NMS, a second version of the hardware compliance data that is in compliance with the applicable regulations of the geographic region. The AP device enables operation of one or more hardware components of the AP device in accordance with the second version of the hardware compliance data.

20 Claims, 13 Drawing Sheets

(51) Int. Cl.
  *H04B 17/21* (2015.01)
  *H04L 5/00* (2006.01)
  *H04W 48/04* (2009.01)
(52) U.S. Cl.
  CPC ....... *H04L 5/0048* (2013.01); *H04W 28/0226* (2013.01); *H04W 48/04* (2013.01)
(58) Field of Classification Search
  CPC ......... H04W 8/22; H04W 8/24; H04W 88/08; H04B 17/11; H04B 17/21; H04L 5/0048; H04L 41/0816; H04L 41/12
  USPC .................................................. 370/329–330
  See application file for complete search history.

(56) References Cited

U.S. PATENT DOCUMENTS

| | | | |
|---|---|---|---|
| 10,756,983 | B2 | 8/2020 | Ratkovic et al. |
| 10,862,742 | B2 | 12/2020 | Singh |
| 10,958,537 | B2 | 3/2021 | Safavi |
| 10,958,585 | B2 | 3/2021 | Safavi |
| 10,985,969 | B2 | 4/2021 | Safavi |
| 10,992,543 | B1 | 4/2021 | Rachamadugu et al. |
| 2010/0210280 | A1* | 8/2010 | Haynes ................. G01S 5/0242 455/456.1 |
| 2014/0273950 | A1* | 9/2014 | Li ......................... H04W 12/08 455/410 |
| 2018/0034703 | A1 | 2/2018 | Anholt et al. |
| 2019/0141572 | A1 | 5/2019 | Zaks et al. |
| 2019/0215058 | A1* | 7/2019 | Smyth ................ H04B 7/18502 |
| 2020/0382372 | A1* | 12/2020 | Easwar Prasad ....... H04L 67/10 |
| 2021/0306201 | A1 | 9/2021 | Wang et al. |

OTHER PUBLICATIONS

Response to Extended Search Report dated Aug. 3, 2023, from counterpart European Application No. 22208387.5 filed Mar. 26, 2024, 22 pp.

* cited by examiner

| Channel | Center Frequency (MHz) | Rates b (SISO) | 20MHz 2Tx | 20MHz 3Tx | 20MHz 4Tx | g (SISO) | g (SISO) |
|---|---|---|---|---|---|---|---|
| 1 | 2412 | 31.25 | 28.25 | 26.50 | 25.25 | 27.50 | 27.50 |
| 2 | 2417 | 31.50 | 30.25 | 28.50 | 27.25 | 30.25 | 30.25 |
| 3 | 2422 | 31.50 | 30.25 | 28.50 | 27.25 | 30.75 | 30.75 |
| 4 | 2427 | 31.50 | 30.25 | 28.50 | 27.25 | 30.75 | 30.75 |
| 5 | 2432 | 31.50 | 30.25 | 28.50 | 27.25 | 30.75 | 30.75 |
| 6 | 2437 | 31.50 | 30.25 | 28.50 | 27.25 | 30.75 | 30.75 |
| 7 | 2442 | 31.50 | 30.25 | 28.50 | 27.25 | 30.75 | 30.75 |
| 8 | 2447 | 31.50 | 30.25 | 28.50 | 27.25 | 30.75 | 30.75 |
| 9 | 2452 | 31.50 | 30.25 | 28.50 | 27.25 | 30.75 | 30.75 |
| 10 | 2457 | 31.50 | 28.50 | 28.75 | 25.50 | 30.75 | 30.75 |
| 11 | 2462 | 30.50 | 27.50 | 25.75 | 24.50 | 28.50 | 28.50 |
| 12 | 2467 | NS | NS | NS | NS | NS | NS |
| 13 | 2472 | NS | NS | NS | NS | NS | NS |

| Rates | OFDM | 11a (SISO) |
|---|---|---|
| Frequency (MHz) 816B | | |
| Channel | | |
| 2 | 5935 | NS |
| 1-93 | 5955-6415 | 19.50 |
| 97-113 | 6435-6515 | 19.50 |
| 117-181 | 6535-6855 | 19.50 |
| 185 | 6875 | 19.50 |
| 189-229 | 6895-7095 | 19.50 |
| 233 | 7115 | 19.50 |

822B-N, 822B-1

814B

| Rates | HEx1 | OFDM(TXBF), OFDM(CDD), HEx1(CDD), HEx1(TXBF) | HEx2(SDM), HEx2(TXBF) | OFDM(TXBF), OFDM(CDD), HEx1(CDD), HEx1(TXBF) | HEx2(SDM), HEx2(TXBF) 818B |
|---|---|---|---|---|---|
| | 11n/11ac/11ax 20MHz 1Tx | 11ax 20MHz 1Tx | 11ax 20MHz 2Tx | 11ax 20MHz 3Tx | 11ax 20MHz 3Tx 820B |
| Frequency (MHz) | | | | | |
| Channel | | | | | |
| 2 | 5935 | NS | NS | NS | NS |
| 1-93 | 5955-6415 | 19.50 | 16.00 | 16.50 | 13.50 | 14.00 |
| 97-113 | 6435-6515 | 19.50 | 16.00 | 16.50 | 13.50 | 14.00 |
| 117-181 | 6535-6855 | 19.50 | 16.00 | 16.50 | 13.50 | 14.00 |
| 185 | 6875 | 19.50 | 16.00 | 16.50 | 13.50 | 14.00 |
| 189-229 | 6895-7095 | 19.50 | 16.00 | 16.50 | 13.50 | 14.00 |
| 233 | 7115 | 19.50 | 16.00 | 16.50 | 13.50 | 14.00 |

FIG. 8B

CLOUD-BASED MANAGEMENT OF HARDWARE COMPLIANCE DATA FOR ACCESS POINT DEVICES

TECHNICAL FIELD

The disclosure relates generally to computer networks and, more specifically, to management of hardware compliance data for wireless network devices.

BACKGROUND

Commercial premises, such as offices, hospitals, airports, stadiums, or retail outlets, often install complex wireless network systems, including a network of wireless access points (APs), throughout the premises to provide wireless network services to one or more wireless client devices (or simply, "clients"). APs are physical, electronic devices that enable other devices to wirelessly connect to a wired network using various wireless networking protocols and technologies, such as wireless local area networking protocols conforming to one or more of the IEEE 802.11 standards (i.e., "WiFi"), Bluetooth/Bluetooth Low Energy (BLE), mesh networking protocols such as ZigBee or other wireless networking technologies. Many different types of wireless client devices, such as laptop computers, smartphones, tablets, wearable devices, appliances, and Internet of Things (IoT) devices, incorporate wireless communication technology and can be configured to connect to wireless access points (APs) when the device is in range of a compatible wireless access point in order to access a wired network.

SUMMARY

In general, this disclosure describes techniques that enable wireless network devices, e.g., access point (AP) devices, to automatically connect to a network management system (NMS) in the microservices cloud to confirm, receive and/or transmit appropriate hardware compliance data in accordance with applicable regional regulation requirements. As described herein, the techniques enable the NMS to maintain hardware compliance for wireless network devices providing a wireless network site. More specifically, certain examples of the disclosed techniques enable the NMS to manage power table information for AP devices having specific power transmission requirements associated with a respective country or geographic region. For example, from time-to-time hardware compliance data based on regulatory requirements may need to be updated for the AP to support a new or changed country-specific regulatory requirement. As described in this disclosure, a cloud-based update of hardware compliance data, including power management tables (PMTs), pushed to the AP through connectivity with the NMS in the microservices cloud may enable the AP to continue to operate using "up-to-date" hardware compliance data without upgrading or updating the entire firmware version of the AP.

This disclosure describes techniques for initializing hardware compliance data updates between the NMS and the plurality of APs providing the wireless network. As described herein, hardware compliance data is formatted for storage in the NMS. For example, as part of a periodic communication and/or a dedicated confirmation message, an AP communicates a current version of the power management table (PMT) stored at the AP. The NMS determines whether the current version of the PMT at the AP is compliant with designated, country-specific hardware regulatory requirements for the AP-hardware specification. The NMS will determine whether the current version of the PMT is compliant or not compliant with the regulatory requirements. In one example, if the NMS determines the AP's current version of the PMT is in compliance, the AP may not need any additional hardware compliance data updates. In an alternative example, if the NMS determines the AP's current version of the PMT is not compliant, the NMS communicates an updated version of the PMT to the AP. The AP receives the new version of the PMT for updating and enables operation of one or more hardware components in accordance with the new version of the PMT. In some examples, the AP may subsequently transmit the new version of the PMT to a plurality of APs at a given site via peer-to-peer transmission.

Power management tables define transmission power ranges for AP devices. For a given frequency band (e.g., 2.4 GHz, 5 GHz, or 6 GHz), channel widths and associated transmission power limits are specified by country-specific regulatory agencies (e.g., the Federal Communications Commission (FCC) in the United States and the European Commission (CE) in Europe). The PMTs may be different in each country and may be changed according to different schedules by the local regulatory agency. With the emergence of the 6 GHz band and future band releases by the appropriate governing bodies with varying release schedules, many organizations having established wireless networks, including wireless network devices, e.g., AP devices, will need to change and update the transmission power limits to include the additional frequency band updates made by country-specific regulatory agencies. Typically, PMTs are hardcoded in the firmware of AP devices such that updating the PMTs requires firmware updates for all APs within a site and/or organization depending on the country or geographic region in which the APs are operating. Currently, PMTs include power transmission information for all AP hardware-specifications, geographical locations, frequency bands, and channel width information, for example.

The techniques of this disclosure provide one or more technical advantages and practical applications. As an example, the horizontal cloud-based architecture described herein may include at least a PMT within a cloud-based NMS with PMT caching at the wireless network edge (e.g., APs). The techniques of this disclosure separate the PMTs from firmware and instead provide only relevant cloud-based PMT updates for APs without requiring a firmware update for each new version of the PMT. Relevant cloud-based PMT updates may be limited to the geographical region, country-specific regulatory updates, AP-hardware specifications, addition of frequency bands, or modifications to channel widths, for example. An advantage to cloud-based management of hardware compliance data, including power table management, is that an organization does not have to make firmware updates of its plurality of AP devices. The hardware compliance data, including PMT updates with, for example, new channel information and new country support regulatory modifications, seamlessly updates the plurality of AP devices based on the hardware-specifications and geographical location of said AP devices. The NMS within the microservices cloud may confirm the appropriate geographical power settings are provisioned according to bandwidth, channel and standards for an AP device or group of APs at a site and/or an organization.

This disclosure proposes a cloud-based management of hardware compliance data for AP devices such that organizations meet appropriate regional-regulatory requirements without spending time to qualify and test the effects of changes to the AP device firmware that may not be required or relevant and further delay any regulatory requirements that may lead to non-compliance.

In one example, this disclosure describes an AP device managed by a cloud-based NMS and configured to provide a wireless network at a site within a geographic region. The AP device comprising memory configured to store hardware compliance data and one or more processors in communication with the memory and configured to send, to the NMS, a message including version information of the hardware compliance data currently stored at the AP device, wherein the version information indicates a first version of the hardware compliance data. In response to the NMS determining that the first version of the hardware compliance data is not in compliance with applicable regulations of the geographic region of the AP device, receive, from the NMS, a second version of the hardware compliance data that is in compliance with the applicable regulations of the geographic region of the AP device. The AP device stores the second version of the hardware compliance data in the memory and enables operation of one or more hardware components of the AP device in accordance with the second version of the hardware compliance data.

In another example, this disclosure describes a network management system (NMS) configured to manage a plurality of access point devices that provide a wireless network at a site within a geographic region. The NMS comprises a memory configured to store hardware compliance data and one or more processors in communication with the memory and configured to receive, from at least one AP device of the plurality of AP devices, a message including version information of the hardware compliance data currently stored at the at least one AP device. The one or more processors configured to determine, based on the version information in the communication, whether a first version of the hardware compliance data stored at the at least on AP device is in compliance with applicable regulations of the geographic region. When the first version of the hardware compliance data is not in compliance, retrieve, from the memory, a second version of the hardware compliance data that is in compliance with the applicable communication regulations of the geographic region. Send the second version of the hardware compliance data to the at least one AP device for use when operating one or more hardware components of the at least one AP device.

In another example, this disclosure describes a method comprising receiving, by a NMS configured to manage a plurality of AP devices that provide a wireless network at a site within a geographic region, a message from at least one AP device of the plurality of AP devices, the message including version information of hardware compliance data currently stored at the at least one AP device. The method comprising determining, by the NMS and based on the version information in the communication, whether a first version of the hardware compliance data stored at the at least one AP device is in compliance with applicable regulations of the geographic region. When the first version of the hardware compliance data is not in compliance, retrieving, by the NMS, a second version of the hardware compliance data that is in compliance with the applicable regulations of the geographic region and sending, by the NMS, the second version of the hardware compliance data to the at least one AP device.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIGS. 8A and 8B illustrate an example power management table stored in the network management system for distribution to the AP devices in the wireless network managed by the cloud-based computing platform, in accordance with the techniques of this disclosure.

Like reference characters refer to like elements throughout the figures and description.

DETAILED DESCRIPTION

Figure 1A:
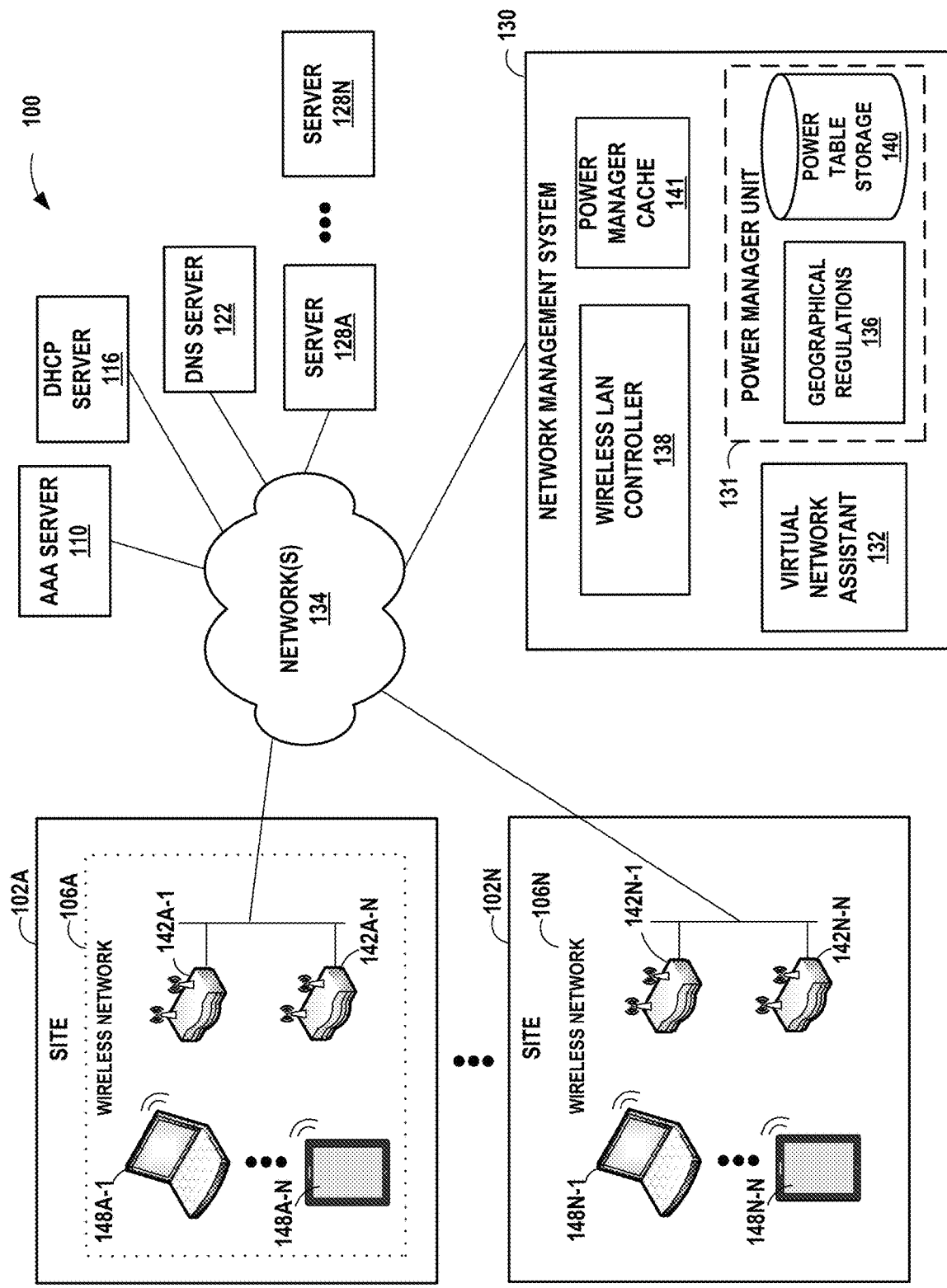
FIG. 1A is a block diagram of an example network system including a cloud-based network management system configured to manage hardware compliance data of access point devices, in accordance with one or more techniques of this disclosure.

FIG. 1A is a block diagram of an example network system 100 including a cloud-based network management system (NMS) 130 configured to manage hardware compliance data, including power management table data to confirm hardware compliance policy of access point devices (APs) connected to access a wireless network, in accordance with one or more techniques of this disclosure. Example network system 100 includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Each site 102A-102N includes a plurality of APs, referred to generally as APs 142. For example, site 102A includes a plurality of APs 142A-1 through 142A-N. Similarly, site 102N includes a plurality of APs 142N-1 through 142N-N. Each AP 142 may be any type of wireless access point, including, but not limited to, a commercial or enterprise AP, a router, or any other device capable of providing wireless network access.

Each site 102A-102N also includes a plurality of client devices, otherwise known as user equipment devices (UEs), referred to generally as UEs 148 or client devices 148, representing various wireless-enabled devices within each site. For example, UEs 148A-1 through 148A-N are currently located at site 102A. Similarly, a plurality of UEs 148N-1 through 148N-N are currently located at site 102N. Each UE 148 may be any type of wireless client device, including, but not limited to, a mobile device such as a smart phone, tablet or laptop computer, a personal digital assistant (PDA), a wireless terminal, a smart watch, smart ring, or other wearable device. UEs 148 may also include IoT client devices such as printers, security devices, environmental sensors, or any other device configured to communicate over one or more wireless networks.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128 (e.g., web servers, databases servers, file servers and the like), and NMS 130. As shown in FIG. 1A, the various devices and systems of network 100 are coupled together via one or more network(s) 134, e.g., the Internet and/or an enterprise intranet. Each one of the servers 110, 116, 122 and/or 128, APs 142, UEs 148, NMS 130, and any other servers or devices attached to or forming part of network system 100 may include a system log or an error log module wherein each one of these devices records the status of the device including normal operational status and error conditions.

In the example of FIG. 1A, NMS 130 is a cloud-based computing platform that manages wireless networks 106A-106N at one or more sites 102A-102N. As further described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation.

In accordance with the techniques described in this disclosure, the cloud-based NMS 130 includes a Power Manager Unit (PMU) 131 having Geographical Regulations Data (GRD) 136 and Power Table Storage (PTS) 140. NMS 130 may also include a front-end with a wireless local area network (LAN) controller (WLC) 138 and a power manager cache (PMC) 141. A version of the power management table corresponding to a specific country may be stored in PMC 141 or PMT 140 as part of a country locale matrix (CLM) of power management tables. In some examples, PMC 141 may comprise a global cache meaning that PMC 141 stores country-specific power management tables for all countries or regions in which supported AP devices are operating. NMS 130 may function in accordance with the techniques described in this disclosure with and/or without a dedicated PMC 141. In some examples, the version of the power management table corresponding to a specific country may be based on information related to a plurality of APs providing at least one wireless network at a site within the specific country, e.g., hardware specifications and/or relevant frequency bandwidth, channel, and channel widths. PMU 131 may determine hardware compliance, including power table information, by a given AP at the site based at least on the geographical location of the given AP along with country-specific regulatory compliance guidelines stored at GRD 136. This disclosure primarily describes hardware compliance data at AP devices as power management tables that include power transmission information for the AP devices, but should not be so limited. In other examples, the hardware compliance data at the AP devices may include radio calibration data or other AP hardware-based data for which compliance with applicable regional regulations is at least recommended.

As one example, upon installation and configuration, an AP, e.g., AP 142A-1, automatically connects to the NMS 130 in the microservices cloud, as described in this disclosure. During configuration, a network administrator may assign AP 142A-1 to the appropriate geographic region or country of site 102A. Alternatively, the AP 142A-1 and/or NMS 130 may automatically determine the geographic region or country in which AP 142A-1 is operating. According to the disclosed techniques, after each reboot or power on of AP 142A-1, NMS 130 in the microservices cloud may receive an initial communication from AP 142A-1 that at least includes version information of the power management table currently used by AP 142A-1. Additionally, or alternatively, as part of the wireless network site 102, AP 142A-1 may send periodic messages to NMS 130 (e.g., every 3 minutes) that include data statistics on signal strength, connected devices, jitter, latency, and the like, and, in accordance with this disclosure, also include the version information of the power management table currently used by AP 142A-1.

PMU 131 of NMS 130 may make a compliance determination for each AP of a plurality of APs, e.g., APs 142A at network site 102A, based on the version information of the power management table included in the initial message and/or the periodic messages received from each AP 142A. In one example, PMU 131 may determine that the selected AP, e.g., AP 142A-1, of plurality of APs 142A is in compliance. PMU 131 verifies that the version information of the power management table stored on AP 142A-1 is in fact in compliance with region or country-specific regulations and, in some examples, hardware-specific settings. Hardware-specific settings may include one or more AP hardware configuration and/or compatibility standards, for example, operating in accordance with existing IEEE 802.11 standards.

In another example, PMU 131 may determine the selected AP 142A-1 of a plurality of APs 142A is not in compliance. In this instance, PMU 131 may identify the up-to-date version of the power management table for the country-specific regulations and hardware-specific settings associated with AP 142A-1. PMU 131 may confirm that the up-to-date version of the power management table is stored in PMC 141. WLC 138 may then distribute the up-to-date version of the power management table held in PMC 141 to AP 142A-1. After receipt, AP 142A-1 may use the up-to-date version of the power management table to replace or overwrite the non-compliant version of the power management table stored at AP 142A-1. AP 142A-1 may then send a message, including acknowledgement of receipt of the up-to-date version of the power management table and/or confirmation of successful installation, to NMS 130. AP 142A-1 enables operation of one or more hardware components in accordance with the recently stored up-to-date version of the power management table. In some examples, AP 142A-1 may further initiate a peer-to-peer software upgrade of the stored up-to-date version of the power management table at the plurality of APs 142A connected to NMS 130 within the wireless network site 102A.

The NMS 130 may periodically collect network data to monitor wireless network behavior and measure one or more aspects of wireless network performance at a site. The network data may be collected from, for example, one or more of client devices and/or one or more APs 142 associated with the wireless network site 102. One or more service level experience (SLE) metrics determined based on the collected network data can be used to measure various aspects of wireless network performance. SLE metrics seek to measure and understand network performance as well as hardware compliance on the network. Example SLE metrics may include time to connect, throughput, successful connects, capacity, AP health, AP power transmission information, AP geography, AP regulatory compliance, and/or any other metric that may be indicative of one or more aspects of wireless network performance. The NMS 130 may further implement systems that automatically identify the root cause(s) of any SLE metrics that do not satisfy the thresholds, and/or that automatically implement one or more remedial actions to address the root cause, thus automatically improving wireless network performance.

In operation, NMS 130 observes, collects and/or receives the network data. The network data is indicative of one or more aspects of wireless network performance. The network data may take the form of data extracted from messages, counters, and statistics, for example. The network data may be collected and/or measured by one or more UEs 148 and/or one or more APs 142 in a wireless network 106. Some of the network data may be collected and/or measured by other devices in the network system 100.

In according with the techniques of this disclosure, PMU 131 of NMS 130 determines the version of the power management table used by a given AP, e.g., AP 142A-1 at site 102A, based on an indication included in the network data within a communication from AP 142A-1. PMU 131 then determines whether the version of the power management table is compliant for the geographic region in which AP 142A-1 is operating. PMU 131 confirms, based on the indication of the version information included in the communication, whether the stored version of the power management table at AP 142A-1 is "up-to-date" compared to the version available for the geographic region (i.e., the version that is in compliance with applicable regulations of the geographic region), e.g., based on GDR 136. As an example, emergence of the 6 GHz band and future band releases by appropriate governing bodies, with varying release schedules, will require organizations having established wireless networks to change and update the transmission power limits at the wireless network devices, e.g., AP devices, to include the additional frequency band updates made by country-specific regulatory agencies. Many countries update regulatory compliance requirements multiple times each year, whereas organizations may update firmware for their wireless network devices less frequently. With frequency bands being added, e.g., 6 GHz, every country and geographical region will implement updated country-specific hardware regulatory requirements as the country opens the frequency band.

If the power management table currently stored at the AP 142A-1 is "up-to-date," AP 142A-1 continues status quo within the wireless network site 102A of the organization. Alternatively, if the currently power management table stored at the AP 142A-1 is not "up-to-date" or not in regulatory compliance, AP 142A-1 receives a new current-compliant version of the power management table from the PMU 131 via WLC 138 of NMS 130 in the microservices cloud. In one scenario, AP 142A-1 may pull or download the appropriate version of the power management table from PMU 131. AP 142A-1 then stores the current-compliant version of the power management table for use during operation. In another alternative scenario, rather than AP 142A-1 pulling or downloading the current-compliant version of the power management table from PMU 131, PMU 131 may push the new current-compliant version of the power management table to the non-compliant AP 142A-1 via WLC 138 of NMS 130 in the microservices cloud. The exchange of the current-compliant version of the power management table occurs via a secure channel between NMS 130 in the microservices cloud and AP 142A-1 with signature check on the power management table.

In some examples, once the appropriate regulatory-compliant power management table is stored on a single, randomly selected AP 142A-1, AP 142A-1 may perform peer-to-peer communication to all the remaining APs 142A within the wireless network site 102A. Alternatively, a network administrator may plan an appropriate system update of all the APs 142A within the wireless network site 102A with the appropriate regulatory-compliant power management table within the geographic region or country.

Regulatory compliance with applicable power management tables is not optional. As such, the functionality of PMU 131 of NMS 130 to check for compliance of power management tables at APs 142 and, when needed, install the software-based power management tables at APs 142, may be performed automatically, without knowledge or approval by the administrator of the site 102. PMU 131 may send a notification to the administrator that a new version of the power management table for the applicable geographic region has been retrieved by the APs 142 at the given site 102. PMU 131 may also generate an administrator-facing user interface that indicates a version of the power management table stored at each AP 142 at the given site 102 and, in some examples, a link to the communication regulations of the applicable geographic region. A firmware update may be needed to configure the APs 142 to handle the compliance checking and installation of the software-based power management tables as described herein.

PMU 131 may maintain GRD 136 to be current and up-to-date based on transmission power limits specified by country-specific regulatory agencies (e.g., the Federal Communications Commission (FCC) in the United States and the European Commission (CE) in Europe). The FCC Mutual Recognition Agreements/Arrangements (MRAs) are government-to-government trade facilitating measures aimed at a global approach to conformity assessment, (see, https://www.fcc.gov/general/equipment-authorization-mutual-recognition-agreements). In other examples, PMU 131 may not maintain GRD 136, but instead may communicate with one or more external databases and/or other computing devices to confirm the current transmission power limits specified by the country-specific regulatory agencies.

Currently, power transmission information is part of the firmware in the form of a power management table that is embedded into the hardware of an AP device such that every AP device has the power management table for every country and configuration that is supported. A power management table may include, but is not limited to, global power transmission information for AP devices at different frequency bands, channels, channel width(s), and regulatory compliance requirements. As such, any external addition, change, or update to the power management table due to country-specific regulatory information requires an update to the firmware of all AP devices.

In accordance with the techniques described in this disclosure, the global power management table is parsed to generate a plurality of power management tables. Currently, to support new and/or changed country regulatory data, a new firmware version is created and deployed to the one or more AP devices. The techniques described in this disclosure may update regulatory data on the one or more AP devices without upgrading the firmware. WLC 138 and/or PMU 131 may utilize a country locale matrix (CLM) to parse the global power management table based on country and/or geographic region. Each one of the plurality of country-specific power management tables corresponds to a country-specific power transmission regulation based on the hardware-specification and determined by the country-specific regulatory agency. In response to a notification received by PMU 131, NMS 130 may store a new power management table for a specific geographic region. For example, GRD 136 of PMU 131 may receive notification that a country-specific regulatory agency has made an update or modification to their power transmission regulations. Based on the country-specific regulatory agency, a new or an up-to-date version of the power management table may be generated either by PMU 131 or manually. NMS 130 stores the new version of the power management table corresponding to the specific country as part of the CLM of power management tables in PMC 141 and/or PTS 140.

A change to the power management table may include the addition of new country support, changes to a specific country's regulatory compliance requirements, modifications to specific frequency band(s), channel(s), or channel width(s) information. As one example, an AP device based in the United States, as part of a wireless network for an organization would need to update the power management firmware if there is an update to the frequency band power management information for Vietnam due to an update in Vietnam's regulatory requirement. In this example, the update is not relevant for the US-based AP device. As such, the organization maintaining the AP device based in the United States may delay this update and spend time qualifying and testing the effects of this change prior to initiating a system-wide update of all AP devices based in the United States for its organization. The delay in updating the information may lead to violation of regulatory requirements and non-compliance of the AP devices based in the United States for this organization, because any AP device based in the United States, as part of a wireless network for an organization operating in Vietnam would violate local Vietnamese regulatory requirements.

In response to the notification received by GDR 136 of updated transmission power limits by a regulatory agency of a given geographic region or country, PMU 130 may generate a new version of the power management table for the given region as a large matrix of numbers and parameters that define the configuration for APs operating within the given region. An example of the power management table is disclosed in FIG. 8A and FIG. 8B. NMS 130 may store the new version of the power management table in the microservices cloud at power table storage 140. In some examples, the new version of the power management table may be stored in PMC 141 and be included in a periodic (e.g., bi-weekly, monthly, or quarterly) software update that is pushed to the cloud for APs to subsequently receive according to a software update schedule or plan. For example, WLC 138 may initiate software upgrades that include the latest version of the applicable power management table for APs at the same site during pre-scheduled down-times, via rolling upgrades across the site to avoid simultaneous reboot, or via peer-to-peer upgrades across the site in order to save bandwidth.

Although PMU 131 includes the GRD 136 in the illustrated example of FIG. 1A, in other examples NMS 130 does not store geographical regulatory information. For example, NMS 130 may receive instructions via an administrator-facing user interface that indicates an update to a geographical region based on the country-specific regulatory agency, and the disclosure is not limited in this respect.

Further example details of operations implemented by the VNA 132 of NMS 130 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," and U.S. application Ser. No. 16/296,902, filed Mar. 8, 2019, and entitled "Method for Conveying AP Error Codes Over BLE Advertisements," all of which are incorporated herein by reference in their entirety.

Figure 1B:
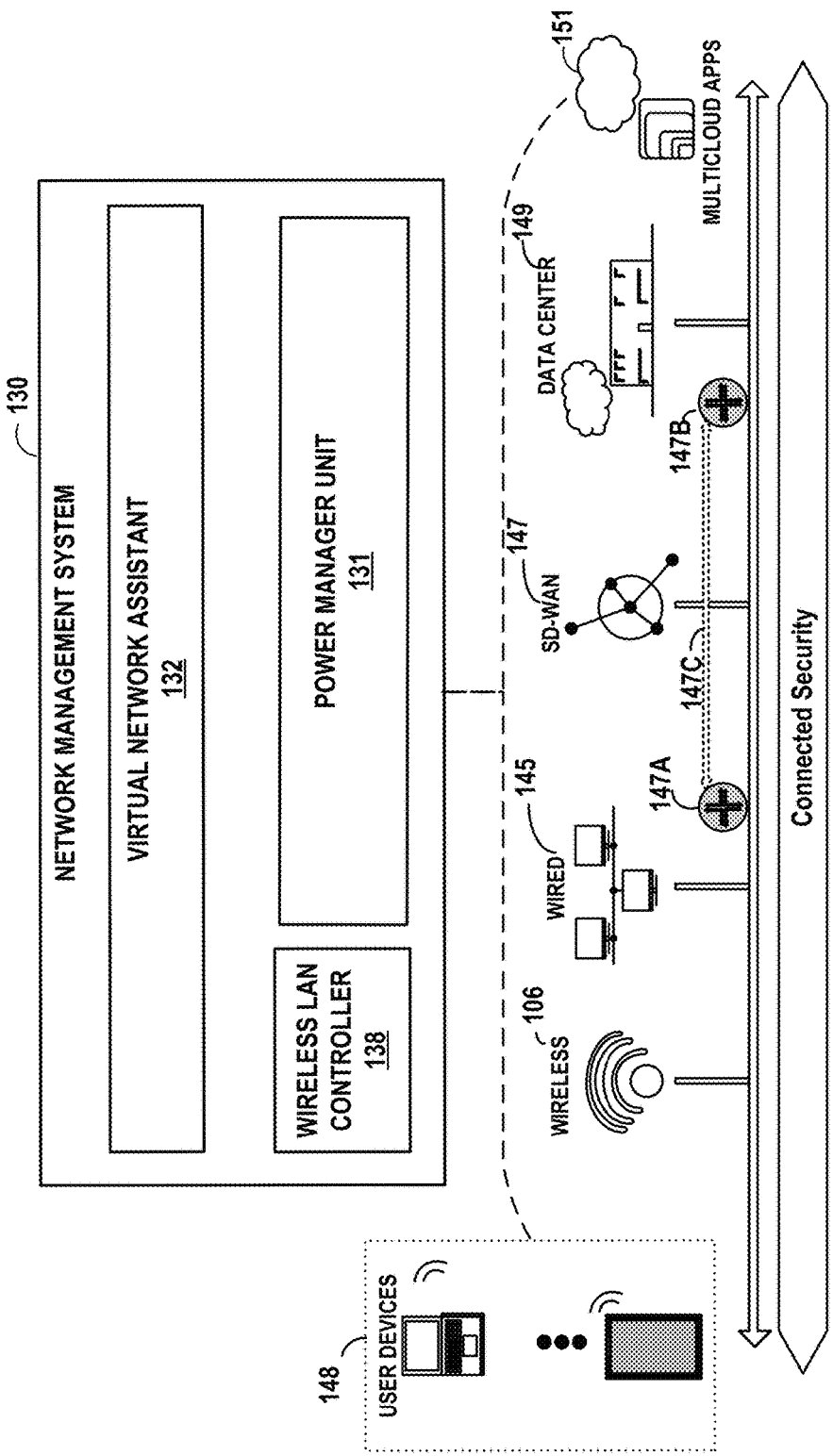
FIG. 1B is a block diagram illustrating further example details of the network system of FIG. 1A.

FIG. 1B is a block diagram illustrating further example details of the network system of FIG. 1A. In this example, FIG. 1B illustrates NMS 130 configured to operate according to an artificial intelligence/machine-learning-based computing platform providing comprehensive automation, insight, and assurance (WiFi Assurance, Wired Assurance and WAN assurance) spanning from wireless network 106 and wired LAN 145 networks at the network edge (far left of FIG. 1B) to cloud-based application services 151 hosted by computing resources within data centers 149 (far right of FIG. 1B).

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, network management system 130 may be configured to proactively monitor and adaptively configure network 100 so as to provide self-driving capabilities. Moreover, VNA 132 includes a natural language processing engine to provide AI-driven support and troubleshooting, anomaly detection, AI-driven location services, and AI-drive RF optimization with reinforcement learning.

As illustrated in the example of FIG. 1B, AI-driven NMS 130 also provides configuration management, monitoring and automated oversight of software defined wide-area network (SD-WAN) 147, which operates as an intermediate network communicatively coupling wireless networks 106 and wired LANs 145 to data centers 149 and application services 151. In general, SD-WAN 147 provides seamless, secure, traffic-engineered connectivity between "spoke" routers 147A of edge wired networks 145 hosting wireless networks 106, such as branch or campus networks, to "hub" routers 147B further up the cloud stack toward cloud-based application services 151. SD-WAN 147 often operates and manages an overlay network 147 on an underlying physical Wide-Area Network (WAN), which provides connectivity to geographically separate customer networks. In other words, SD-WAN 147 extends Software-Defined Networking (SDN) capabilities to a WAN and allows network(s) to decouple underlying physical network infrastructure from virtualized network infrastructure and applications such that the networks may be configured and managed in a flexible and scalable manner.

In some examples, underlying routers of SD-WAN 147 may implement a stateful, session-based routing scheme in which the routers 147A, 147B dynamically modify contents of original packet headers sourced by client devices 148 to steer traffic along selected paths, e.g., path 147C, toward application services 151 without requiring use of tunnels and/or additional labels. In this way, routers 147A, 147B may be more efficient and scalable for large networks since the use of tunnel-less, session-based routing may enable routers 147A, 147B to achieve considerable network resources by obviating the need to perform encapsulation and decapsulation at tunnel endpoints. Moreover, in some examples, each router 147A, 147B may independently perform path selection and traffic engineering to control packet flows associated with each session without requiring use of a centralized SDN controller for path selection and label distribution. In some examples, routers 147A, 147B implement session-based routing as Secure Vector Routing (SVR), provided by Juniper Networks, Inc.

As discussed above with respect to FIG. 1A, PMU 131 of NMS 130 may maintain or have access to a plurality of country-specific regulations, scheduled changes, pending changes, and/or adoption information based on information related to any planned regulatory updates. The planned regulatory updates may be based on global governing bodies in the wireless communications standards space, including, the WiFi Alliance organization. PMU 131 stores power management tables and determines the up-to-date version for the power management tables based on the country-specific regulations. Any regulatory hardware compliance change may initiate an update to one or more power management tables stored by PMU 131. Each of the APs 142 providing wireless network 106 may periodically send messages to NMS 130 that include version information of the power management table currently stored at the respective AP. PMU 141 verifies the version information for the power management table received from the respective AP. In one scenario, when the received version information for the power management table from the respective AP is up-to-date with the power management table stored at PMU 131, the respective AP is in compliance. In an alternative scenario, when the received version information for the power management table from the respective AP is outdated as compared with the power management table stored at PMU 131, PMU 131 retrieves the up-to-date version of the power management table and sends the up-to-date version of the power management table to at least the respective AP. In response, the respective AP may send NMS 130 an acknowledgment of successful receipt and/or installation of the new up-to-date power management table.

In some examples, AI-driven NMS 130 may enable intent-based configuration and management of network system 100, including enabling construction, presentation, and execution of intent-driven workflows for configuring and managing devices associated with wireless networks 106, wired LAN networks 145, and/or SD-WAN 147. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

Figure 2:
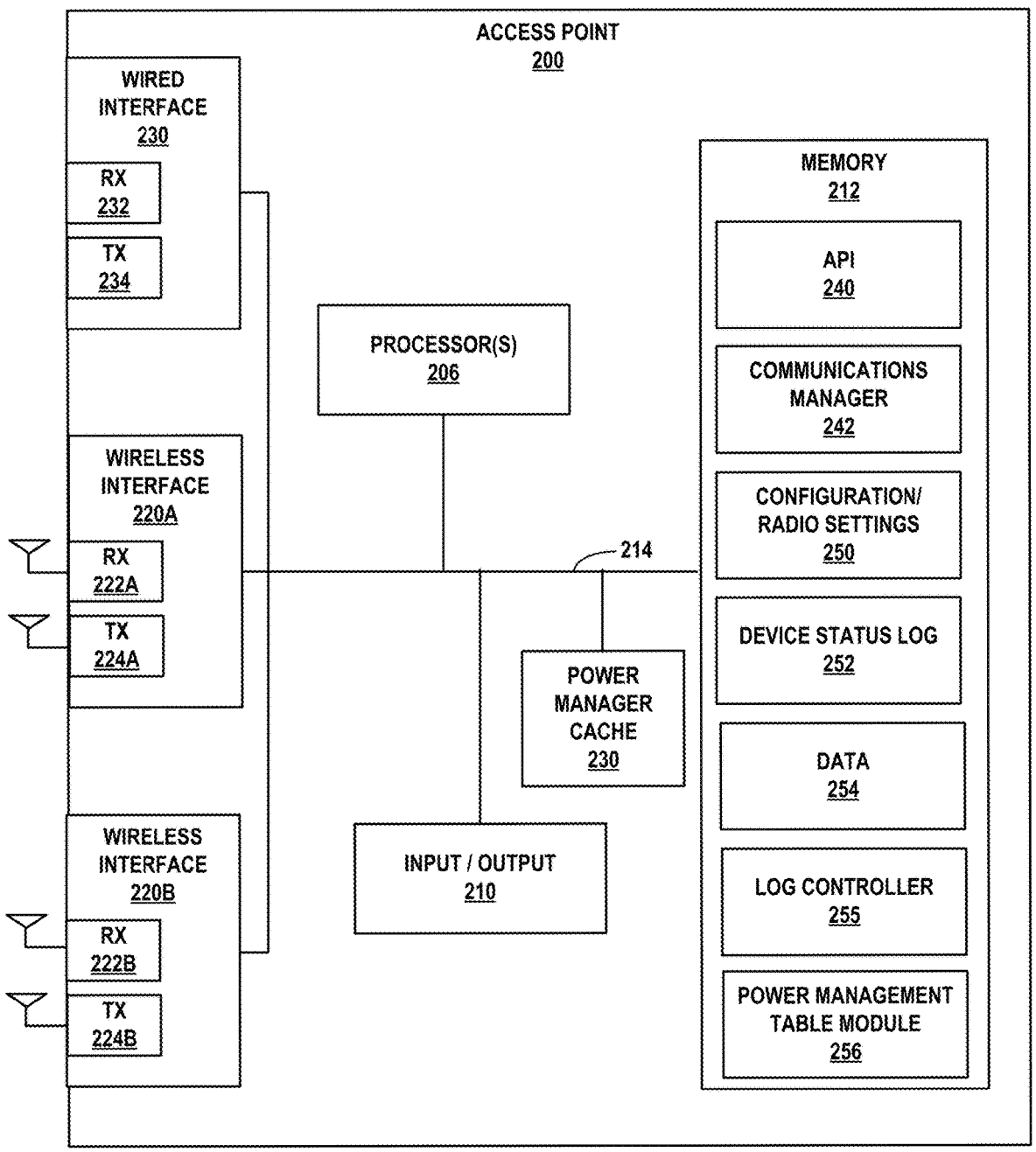
FIG. 2 is a block diagram of an example access point device, in accordance with one or more techniques of this disclosure.

FIG. 2 is a block diagram of an example access point (AP) device 200 configured in accordance with one or more techniques of this disclosure. Example access point 200 shown in FIG. 2 may be used to implement any of APs 142 as shown and described herein with respect to FIG. 1A. Access point 200 may comprise, for example, a Wi-Fi, Bluetooth and/or Bluetooth Low Energy (BLE) base station or any other type of wireless access point.

In the example of FIG. 2, access point 200 includes a wired interface 230, wireless interfaces 220A-220B one or more processor(s) 206, memory 212, and input/output 210 coupled together via a bus 214 over which the various elements may exchange data and information. Wired interface 230 represents a physical network interface and includes a receiver (RX) 232 and a transmitter (TX) 234 for sending and receiving network communications, e.g., packets. Wired interface 230 couples, either directly or indirectly, access point 200 to network(s) 134 of FIG. 1A. First and second wireless interfaces 220A and 220B represent wireless network interfaces and include receivers (RX) 222A and 222B, respectively, each including a receive antenna via which access point 200 may receive wireless signals from wireless communications devices, such as UEs 148 of FIG. 1A. First and second wireless interfaces 220A and 220B further include transmitters (TX) 224A and 224B, respectively, each including transmit antennas via which access point 200 may transmit wireless signals to wireless communications devices, such as UEs 148 of FIG. 1A. In some examples, first wireless interface 220A may include a Wi-Fi 802.11 interface (e.g., 2.4 GHz and/or 5 GHz) and second wireless interface 220B may include a Bluetooth interface and/or a Bluetooth Low Energy (BLE) interface.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform the techniques described herein.

Memory 212 includes one or more devices configured to store programming modules and/or data associated with operation of access point 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform the techniques described herein.

Currently, hardware compliance data, for example a power management table, for an AP device has the power transmission information for every supported hardware-specification and every frequency band. According to this disclosure, in scenarios where access point 200 is a new access point device, access point 200 may be configured with Power Management Table Module 256 to digest power management table information received as a software update from NMS 130. Furthermore, according to this disclosure, in scenarios where access point 200 is an existing, deployed access point device, access point 200 may undergo an initial firmware update to enable Power Management Table Module 256 to digest power management table information received as a software update from NMS 130. The power management table information received by access point 200 may be limited and/or parsed based on geographical information for access point 200. For example, an AP device deployed in Germany may only require confirmation of hardware compliance data related to EU-regulatory requirements, and/or more specifically Germany. In this example, the AP device operating in Germany would not be required to update its power management table when the US makes changes to its power management table information because of US-regulatory updates.

Device status log 252 includes network data, e.g., a list of network parameters and/or network events, specific to AP 200 and/or client devices currently or previously associated with AP 200. The network data may include, for example, any network parameter and/or network data indicative of one or more aspects of performance of the wireless network or of the AP 200 itself. In some examples, the network data may include a plurality of stats measured periodically as time series data. The network data may be measured by the UE devices 148 and transmitted to AP 200, may be measured by AP 200 itself or by any other device associated with the wireless network and transmitted to AP 200.

Network data stored in data storage 254 may include, for example, AP events and/or UE events. In some examples, the network events are classified as positive network events, neutral network events, and/or negative network events. The network events may include, for example, memory status, reboot events, crash events, Ethernet port status, upgrade failure events, firmware upgrade events, configuration changes, authentication events, DNS events, DHCP events, one or more types of roaming events, hardware compliance data upgrade events, as well as a time and date stamp for each event. Log controller 255 determines a logging level for the device based on instructions from NMS 130. Data 254 may store any data used and/or generated by access point 200, including data collected from UEs 148, such as data used to calculate one or more SLE metrics, that is transmitted by access point 200 for cloud-based management of wireless networks 106A by NMS 130. For example, a UE 148 that executes a roaming event may measure or collect data concerning the number of available roaming options and/or the types of roaming options at the time of the roaming event, a first RSSI of a first wireless signal received from a first AP associated with the roaming event (e.g., the current AP or AP that was disassociated from) and a second RSSI of a second wireless signal received from a second AP associated with the roaming event (e.g., the target AP or AP that was re-associated to). In another example, data 254 may store any data used and/or generated by access point 200, such as version information of hardware compliance data for country-specific regulations and AP hardware-specific configuration.

In accordance with the disclosed techniques, access point 200 sends periodic messages including network data and the version information of the power management table stored in Power Manager Cache 230. NMS 130 determines whether the version of the power management table stored at the AP is "up-to-date." When the version information for the power management table used by access point 200 is current, NMS 130 verifies that the version information received from access point 200 is "up-to-date." In an alternative scenario, when the version information for the power management table used by access point 200 is outdated, NMS 130 retrieves the up-to-date version of the hardware compliance data and sends the up-to-date version to access point 200 as a replacement for the outdated version information currently stored at PMC 230 of access point 200. Access point 200 receives the up-to-date version of the power management table, and PMT module 256 digests the updated power management table for storage in PMC 230 for use in operating hardware components of access point 200.

Figure 3:
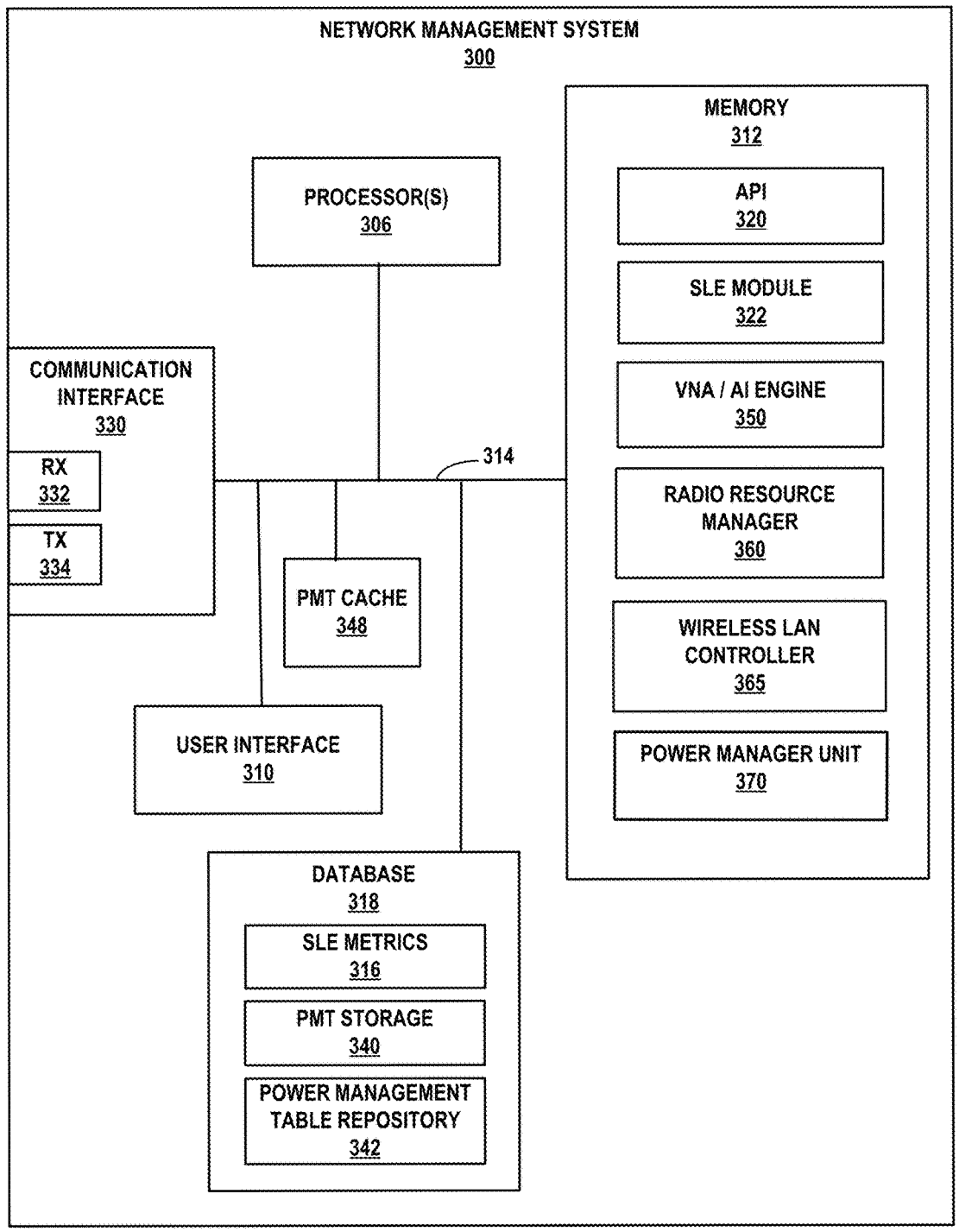
FIG. 3 is a block diagram of an example network management system having a power manager configured to manage power tables for a plurality of access point devices, in accordance with one or more techniques of this disclosure.

FIG. 3 shows an example NMS 300 having a power manager unit (PMU) 370 configured to manage power management tables for a plurality of wireless network devices, e.g., AP devices, in accordance with one or more techniques of this disclosure. NMS 300 and PMU 370 operate substantially similar to NMS 130 and PMU 131 of FIG. 1A. In such examples, NMS 300 is responsible for monitoring and management of one or more wireless networks 106A-106N at sites 102A-102N, respectively. In some examples, NMS 300 receives data collected by APs 200 from UEs 148, such as data used to calculate one or more SLE metrics, and analyzes this data for cloud-based management of wireless networks 106A-106N. In some examples, NMS 300 may be part of another server shown in FIG. 1A or a part of any other server.

NMS 300 includes a communications interface 330, one or more processor(s) 306, a user interface 310, a memory 312, and a database 318. The various elements are coupled together via a bus 314 over which the various elements may exchange data and information.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks. Communications interface 330 includes a receiver (RX) 332 and a transmitter (TX) 334 by which NMS 300 receives/transmits data and information to/from any of APs 142, servers 110, 116, 122, 128 and/or any other devices or systems forming part of network 100 such as shown in FIG. 1A. The data and information received by NMS 300 may include, for example, SLE related or event log data received from access points 200 used by NMS 300 to remotely monitor the performance of wireless networks 106A-106N. NMS may further transmit data via communications interface 330 to any of network devices such as APs 142 at any of network sites 102A-102N to remotely manage wireless networks 106A-106N.

Memory 312 includes one or more devices configured to store programming modules and/or data associated with operation of NMS 300. For example, memory 312 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, an SLE module 322, a virtual network assistant (VNA)/AI engine 350, a radio resource management (RRM) engine 360, a wireless LAN controller (WLC) 365, and PMU 370. NMS 300 may also include any other programmed modules, software engines and/or interfaces configured for remote monitoring and management of wireless networks 106A-106N, including remote monitoring and management of any of APs 142/200.

SLE module 322 enables set up and tracking of thresholds for SLE metrics for each network 106A-106N. SLE module 322 further analyzes SLE-related data collected by APs, such as any of APs 142 from UEs in each wireless network 106A-106N. For example, APs 142A-1through 142A-N collect SLE-related data from UEs 148A-1through 148A-N currently connected to wireless network 106A. This data is transmitted to NMS 300, which executes by SLE module 322 to determine one or more SLE metrics for each UE 148A-1 through 148A-N currently connected to wireless network 106A. This data, in addition to any network data collected by one or more APs 142A-1 through 142A-N in wireless network 106A, is transmitted to NMS 300 and stored as, for example, SLE metrics 316 in database 318.

RRM engine 360 monitors one or more metrics for each site 106A-106N in order to learn and optimize the RF environment at each site. For example, RRM engine 360 may monitor the coverage and capacity SLE metrics for a wireless network 106 at a site 102 in order to identify potential issues with SLE coverage and/or capacity in the wireless network 106 and to make adjustments to the radio settings of the access points at each site to address the identified issues. For example, RRM engine may determine channel and transmit power distribution across all APs 142 in each network 106A-106N. For example, RRM engine 360 may monitor events, power, channel, bandwidth, and number of clients connected to each AP. RRM engine 360 may further automatically change or update configurations of one or more APs 142 at a site 106 with an aim to improve the coverage and capacity SLE metrics and thus to provide an improved wireless experience for the user.

VNA/AI engine 350 may operate substantially similar to VNA 132 of FIG. 1A. VNA/AI engine 350 analyzes data received from APs 142/200 as well as its own data to identify when undesired to abnormal states are encountered in one of wireless networks 106A-106N. For example, VNA/AI engine 350 may identify the root cause of any undesired or abnormal states, e.g., any poor SLE metric(s) at one or more of wireless network 106A-106N. In addition, VNA/AI engine 350 may automatically invoke one or more corrective actions intended to address the identified root cause(s) of one or more poor SLE metrics. Examples of corrective actions that may be automatically invoked by VNA/AI engine 350 may include, but are not limited to, invoking RRM 360 to reboot one or more APs, adjusting/modifying the transmit power of a specific radio in a specific AP, adding SSID configuration to a specific AP, changing channels on an AP or a set of APs, etc. The corrective actions may further include restarting a switch and/or a router, invoke downloading of new software to an AP, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel to address the network error.

In accordance with one or more techniques of this disclosure, PMU 370 of NMS 300 enables wireless network devices, e.g., AP devices, to automatically connect in the microservices cloud and confirm, receive, and/or transmit appropriate hardware compliance data, e.g., power management tables, in accordance with applicable regional regulation requirements. PMU 370 is configured to maintain power management tables in accordance with hardware-specific configurations and geographical regulations. PMU 370 of NMS 300 may operate substantially similar to PMU 131 of NMS 130 from FIGS. 1A-1B.

PMU 370 may monitor one or more external metrics to remain current with geographical regulations and the country locale matrix parsed power management tables. When the NMS 300 receives a message periodically from one or more AP devices, the message having a first version of the power management table stored at the one or more AP devices, the PMU 370 performs a comparison. The PMU 370 compares the first version of the power management table stored at the one or more AP devices with the power management table stored in PMT storage 340. In one scenario, the comparison results confirm compliance of the one or more AP devices with current hardware compliance data based on country-specific regulations. In another scenario, the comparison results in non-compliance of the one or more AP devices based on current hardware compliance data. In this scenario, PMU 370 retrieves a second version of the hardware compliance data from PMT storage 240 that is in compliance with applicable regulations. NMS 300 sends the second version of the hardware compliance data to the one or more AP devices. NMS 300 may store the second version of the hardware compliance data at PMT cache 348 for distribution to one or more AP devices via WLC 365.

In the illustrated example of FIG. 3, NMS 300 includes PMT storage 340 and PMT repository 342 within database 318. PMU 370 may store regional or parsed power management tables in PMT storage 340, and may also include PMT cache 348 accessible by WLC 365 that is configured to temporarily hold at least a sub-set of the power management tables stored in PMT storage 340. PMT repository 342 may store the complete global PMT for all wireless hardware configurations. PMT repository 342 may maintain various versions of the global PMT, as updates, modifications, and changes are made based on country-specific regional regulatory changes at varying schedules. In the scenario where a historical version or an "outdated" version of the global PMT needs to be accessed, PMT Repository 342 may have this information. PMT storage 340 and/or PMT repository 342 may be hosted in the micro-services cloud infrastructure of NMS 300 with no scaling limits.

Figure 4:
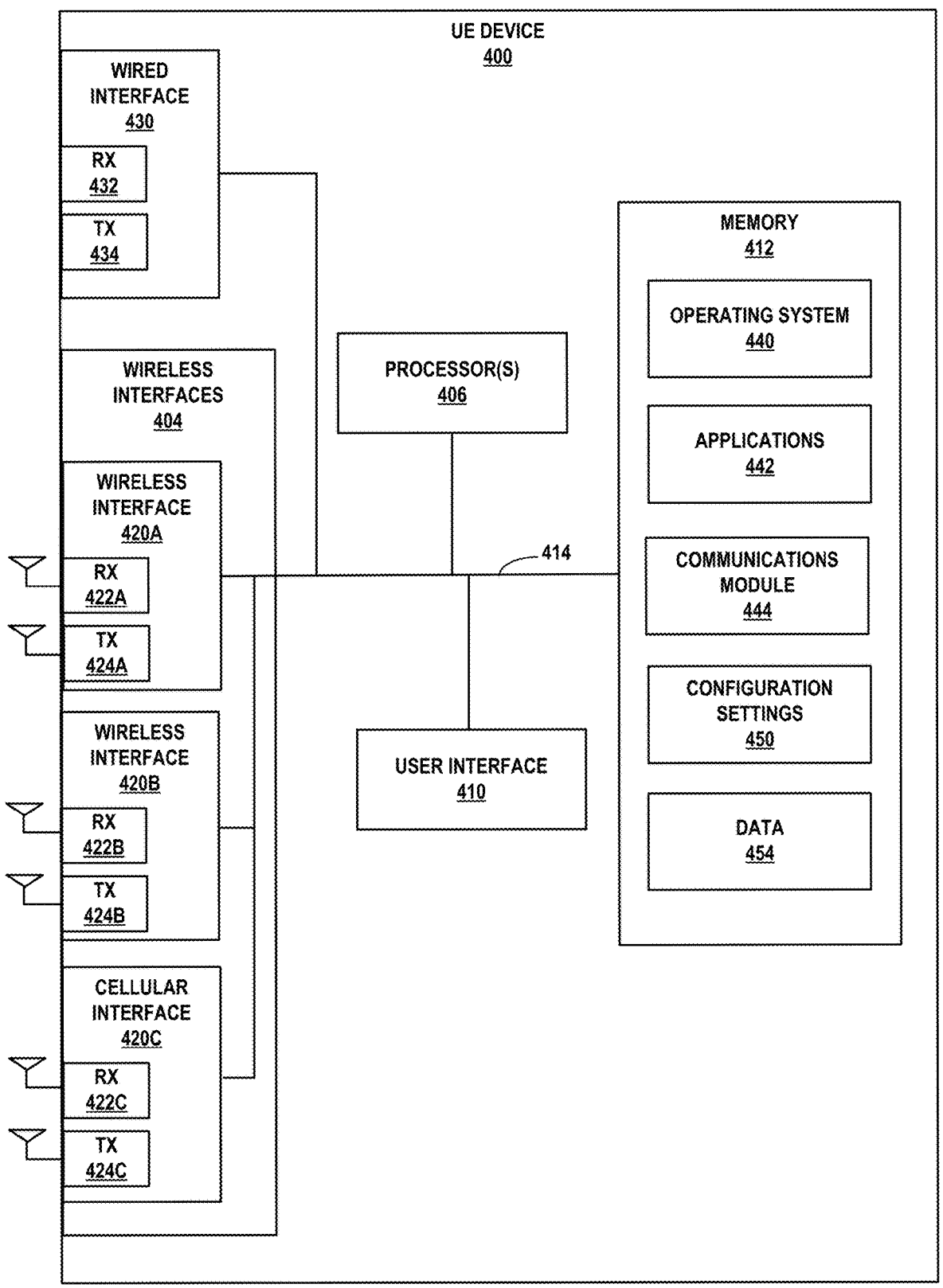
FIG. 4 is a block diagram of an example user equipment device, in accordance with one or more techniques of this disclosure.

FIG. 4 shows an example user equipment (UE) device 400. Example UE device 400 shown in FIG. 4 may be used to implement any of UEs 148 as shown and described herein with respect to FIG. 1A. UE device 400 may include any type of wireless client device, and the disclosure is not limited in this respect. For example, UE device 400 may include a mobile device such as a smart phone, tablet or laptop computer, a personal digital assistant (PDA), a wireless terminal, a smart watch, a smart ring, or any other type of mobile or wearable device. UE 400 may also include any type of IoT client device such as a printer, a security sensor or device, an environmental sensor, or any other connected device configured to communicate over one or more wireless networks. UE 400 may comprise a wireless client device designated as a BYOD device that is user-owned and unaffiliated with a particular enterprise or corporate site and/or wireless network.

UE device 400 includes a wired interface 430, wireless interfaces 404 including wireless interfaces 420A-420C, one or more processor(s) 406, memory 412, and a user interface 410. The various elements are coupled together via a bus 414 over which the various elements may exchange data and information. Wired interface 430 includes a receiver (RX) 432 and a transmitter (TX) 434. Wired interface 430 may be used, if desired, to couple UE 400 to network(s) 134 of FIG. 1A. First, second and third wireless interfaces 420A, 420B, and 420C include receivers (RX) 422A, 422B, and 422C, respectively, each including a receive antenna via which UE 400 may receive wireless signals from wireless communications devices, such as APs 142 of FIG. 1A, AP 200 of FIG. 2, other UEs 148, or other devices configured for wireless communication. First, second, and third wireless interfaces 420A, 420B, and 420C further include transmitters (TX) 424A, 424B, and 424C, respectively, each including transmit antennas via which UE 400 may transmit wireless signals to wireless communications devices, such as APs 142 of FIG. 1A, AP 200 of FIG. 2, other UEs 148 and/or other devices configured for wireless communication. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy interface. Third wireless interface 420C may include, for example, a cellular interface through which UE device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of UE 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein.

In this example, memory 412 includes an operating system 440, applications 442, a communications module 444, configuration settings 450, and data storage 454. Data storage 454 may store any data used and/or generated by UE 400 that is collected by UE 400 and transmitted to any of APs 142 in a wireless network 106 for further transmission to NMS 130. For example, data storage 454 may include, for example, one or more passphrases for known wireless network names (e.g., SSIDs). In other examples, the one or more passphrases may be included in configuration settings 450 for wireless interfaces 404.

Communications module 444 includes program code that, when executed by processor(s) 406, enables UE 400 to communicate using any of wired interface(s) 430, wireless interfaces 420A-420B and/or cellular interface 450C. Configuration settings 450 include any device settings for UE 400 and/or settings for each of wireless interface(s) 420A-420B and/or cellular interface 420C.

Figure 5:
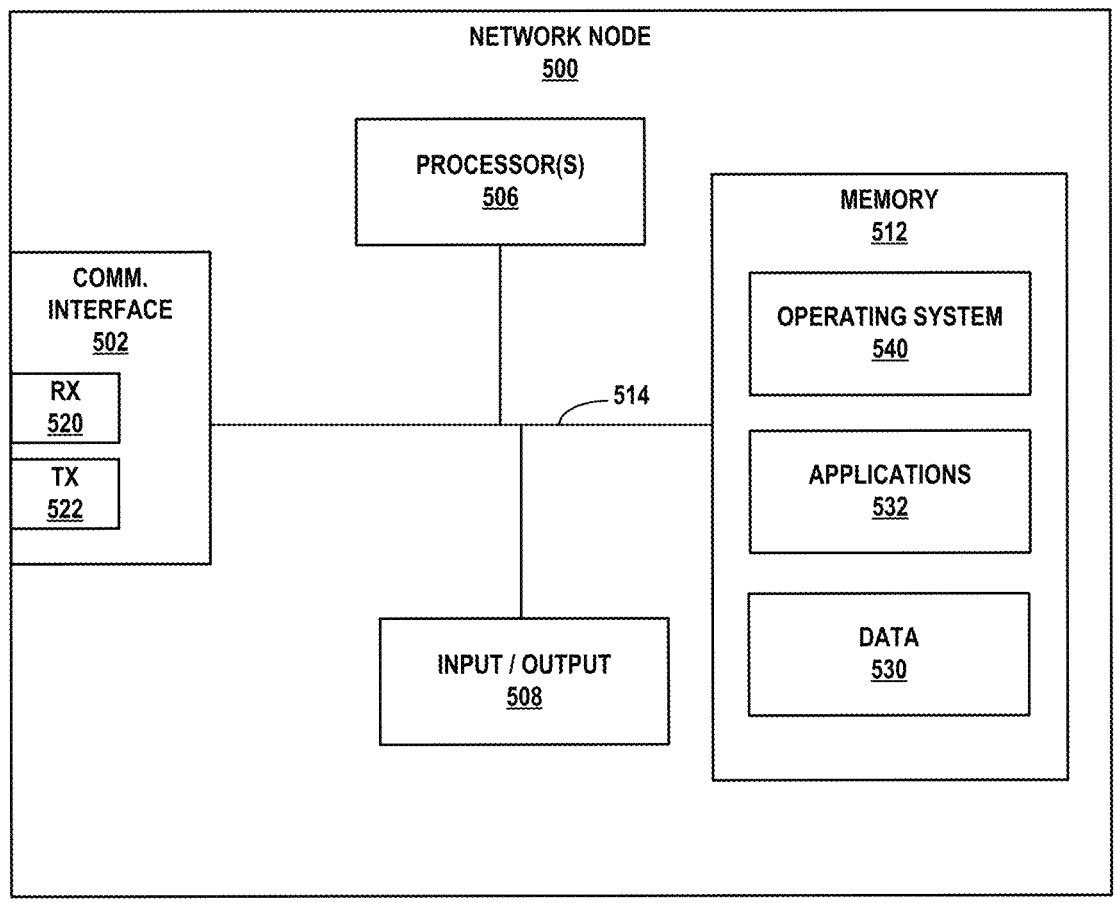
FIG. 5 is a block diagram of an example network node, such as a router or switch, in accordance with one or more techniques of this disclosure.

FIG. 5 is a block diagram illustrating an example network node 500 configured according to the techniques described herein. In one or more examples, the network node 500 implements a device or a server attached to the network 134 of FIG. 1, e.g., router, switch, AAA server, DHCP server, DNS server, VNA, Web server, etc., or a network device such as, e.g., routers, switches, or the like. In some embodiments, network node 500 of FIG. 5 is server 110, 116, 122, 128, of FIG. 1A or routers/switches of network 134 of FIG. 1A.

In this example, network node 500 includes a communications interface 502, e.g., an Ethernet interface, a processor 506, input/output 508, e.g., display, buttons, keyboard, keypad, touch screen, mouse, etc., a memory 512 coupled together via a bus 514 over which the various elements may interchange data and information. Communications interface 502 couples the network node 500 to a network, such as an enterprise network. Though only one interface is shown by way of example, those skilled in the art should recognize that network nodes may, and usually do, have multiple communication interfaces. Communications interface 502 includes a receiver (RX) 520 via which the network node 500, e.g., a server, can receive data and information, e.g., including operation related information, registration requests, AAA services, DHCP requests, Simple Notification Service (SNS) look-ups, and Web page requests. Communications interface 502 includes a transmitter (TX) 522, via which the network node 500, e.g., a server, can send data and information, e.g., including configuration information, authentication information, web page data, etc.

Memory 512 stores executable software applications 532, operating system 540 and data/information 530. Data 530 may include a system log and/or error log that stores SLE metrics for node 500 and/or other devices, such as wireless access points, based on a logging level according to instructions from the network management system. Network node 500 may, in some examples, forward the SLE metrics to a network management system (e.g., NMS 130 of FIG. 1A) for analysis as described herein.

In this example, network node 500 includes a communications interface 502, e.g., an Ethernet interface, a processor 506, input/output 508, e.g., display, buttons, keyboard, keypad, touch screen, mouse, etc., a memory 512 coupled together via a bus 514 over which the various elements may interchange data and information. Communications interface 502 couples the network node 500 to a network, such as an enterprise network. Though only one interface is shown by way of example, those skilled in the art should recognize that network nodes may, and usually do, have multiple communication interfaces. Communications interface 502 includes a receiver (RX) 520 via which the network node 500, e.g., a server, can receive data and information, e.g., including operation related information, registration requests, AAA services, DHCP requests, Simple Notification Service (SNS) look-ups, and Web page requests. Communications interface 502 includes a transmitter (TX) 522, via which the network node 500, e.g., a server, can send data and information, e.g., including configuration information, authentication information, web page data, etc.

Memory 512 stores executable software applications 532, operating system 540 and data/information 530. Data 530 may include a system log and/or error log that stores SLE metrics for node 500 and/or other devices, such as wireless access points, based on a logging level according to instructions from the network management system. Network node 500 may, in some examples, forward the SLE metrics to a network management system (e.g., NMS 130 of FIG. 1A) for analysis as described herein.

Figure 6:
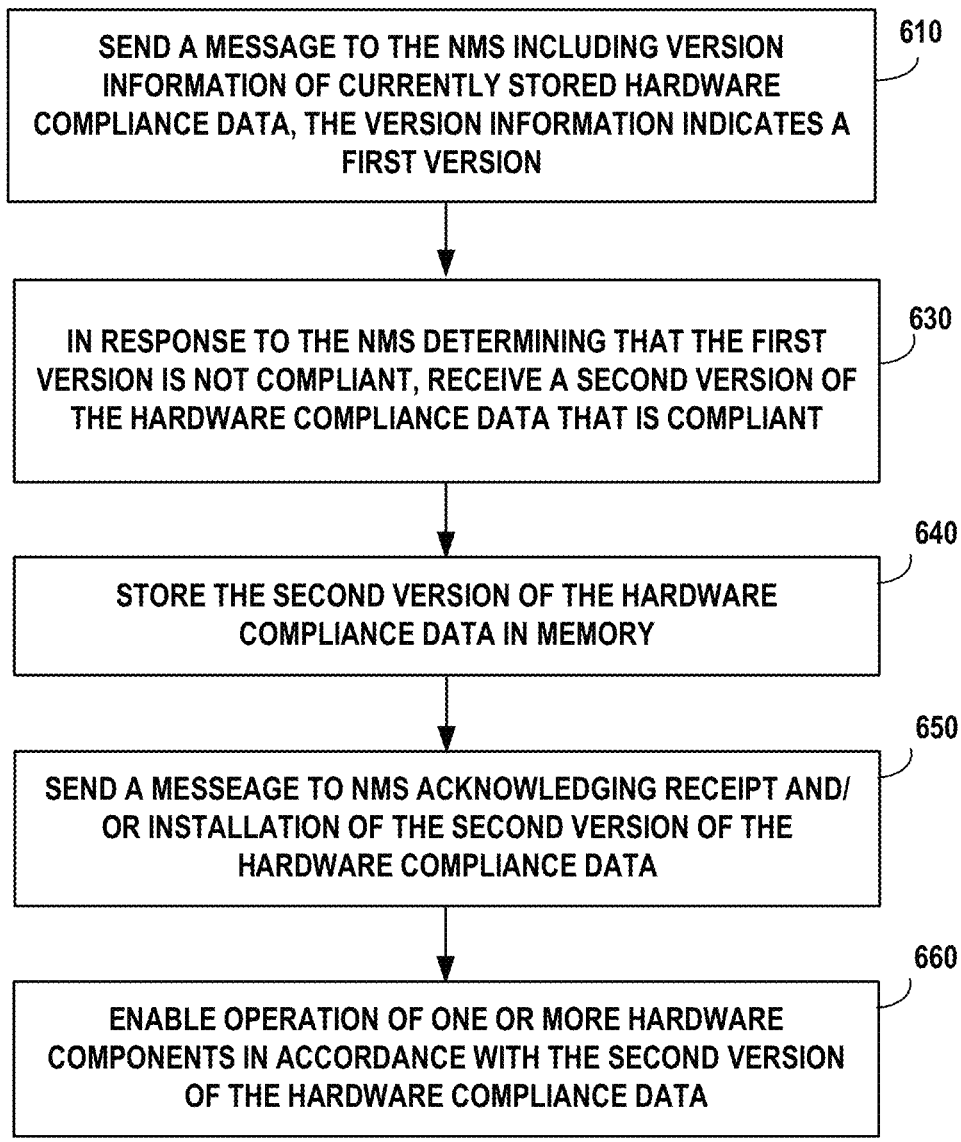
FIG. 6 is a flow chart illustrating an example operation by which the access point device is configured to communicate version information for hardware compliance data to the network management system, in accordance with one or more techniques of this disclosure.

FIG. 6 is a flow chart illustrating an example operation by which an access point communicates version information of hardware compliance data to the network management system, in accordance with one or more techniques of this disclosure. The example operation of FIG. 6 is described herein with respect to access point 200 of FIG. 2. In other examples, the operation of FIG. 6 may be performed by other computing systems or devices configured to determine compliance, such as any of APs 142 providing wireless networks 106 from FIGS. 1A-1B.

Access point 200 sends a message to the NMS that includes version information of hardware compliance data currently stored in PMC 230 of access point 200, the version information indicates a first version of the hardware compliance data (610). In the example of FIG. 6, the hardware compliance data includes a power management table. In other examples, the hardware compliance data includes radio calibration data. In some examples, access point 200 may include the version information of the hardware compliance data with network data that access point 200 periodically sends to the NMS. In other examples, after each power on of access point 200, access point 200 may send an initial message to the NMS that at least includes the version information of the hardware compliance data.

In response to the NMS determining that the first version of the hardware compliance data is not in compliance with applicable regulations of the geographic region of access point 200, access point 200 receives, from the NMS, a second version of the hardware compliance data that is in compliance with the applicable regulations of the geographic region of access point 200 (630). In one example, access point 200 may receive the second version of the hardware compliance data as a data transfer initiated by the NMS in response to the NMS determining that the first version of the hardware compliance data is not in compliance with the applicable regulations of the geographic region of the AP device. In another example, access point 200 may receive, from the NMS, an indication that the first version of the hardware compliance data is not in compliance with the applicable regulations of the geographic region of access point 200. In response to the indication, access point 200 may initiate a data transfer from the NMS of the second version of the hardware compliance data that is in compliance with the applicable regulations of the geographic region of access point 200.

In any of the above scenarios, in response to receipt of the second version of the hardware compliance data, access point 200 digests the second version of the hardware compliance data for storage by access point 200. Access point 200 stores the second version of the hardware compliance data in memory, e.g., PMC 230 (640). For example, access point 200 may overwrite the first version of the hardware compliance data in PMC 230 with the second version of the hardware compliance data. In some examples, access point 200 may send a message, as part of the periodic messaging of network data or as a dedicated message, to the NMS acknowledging successful receipt and/or installation of the second version of the hardware compliance data in memory (650).

In certain scenarios, the access point 200 fails to digest the second version of the hardware compliance data. In this instance, the access point 200 will revert to the first version of the hardware compliance data. The access point 200 may send a message, as part of the periodic messaging of network data or as a dedicated message, to the NMS acknowledging a failed receipt and/or installation of the second version of the hardware compliance data in memory (650). The access point 200 may receive subsequent receipt of the second version of the hardware compliance data from the NMS and/or from peer-to-peer transfer from one or more APs connected to the wireless network.

Access point 200 enables operation of one or more hardware components of access point 200 in accordance with the second version of the hardware compliance data (660). Access point 200, having stored the second version of the hardware compliance data in PMC 230, may further initiate a peer-to-peer software upgrade of the stored up-to-date version of the hardware compliance data to the plurality of APs within the same wireless network site as access point 200.

Figure 7:
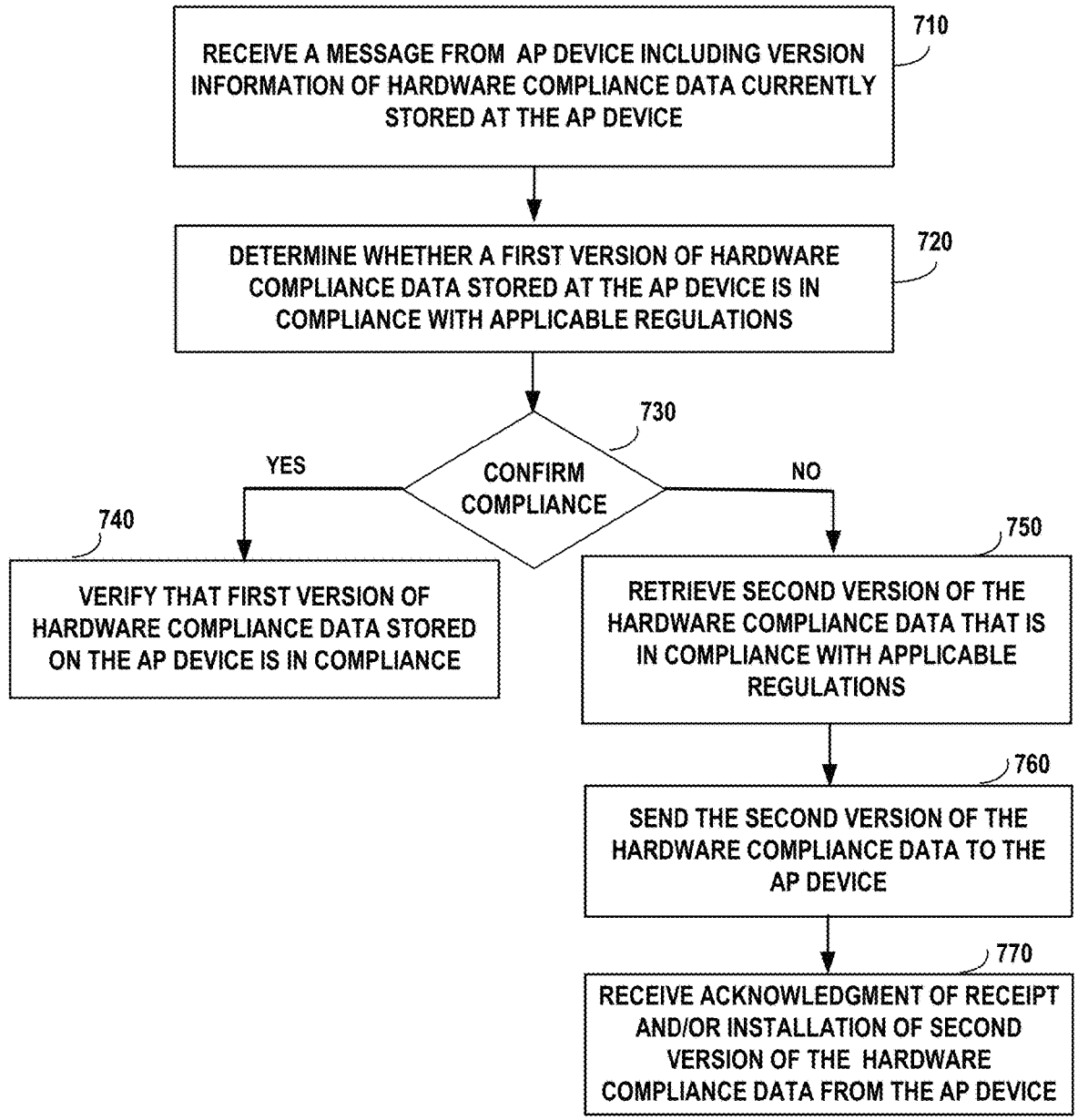
FIG. 7 is a flow chart illustrating an example operation by which the network management system is configured to manage hardware compliance data of access point devices, in accordance with one or more techniques of this disclosure.

FIG. 7 is a flow chart illustrating an example operation by which the network management system is configured to manage hardware compliance data of access point devices, in accordance with one or more techniques of this disclosure. The example operation of FIG. 7 is described herein with respect to NMS 300 of FIG. 3. In other examples, the operation of FIG. 7 may be performed by other computing systems or devices configured to determine compliance, such as NMS 130 from FIGS. 1A-1B.

NMS 300 receives, from at least one AP device of a plurality of AP devices at a site, a message including version information of hardware compliance data currently stored at the AP device (710). In the example of FIG. 7, the hardware compliance data includes a power management table. In other examples, the hardware compliance data includes radio calibration data. In some examples, NMS 300 may periodically receive a message including network data and the version information of the hardware compliance data from the AP device. In other examples, NMS 300 may, after each power on of the AP device, receive an initial message from the AP device that at least includes the version information of the hardware compliance data.

NMS 300 determines, based on the version information in the communication, whether a first version of the hardware compliance data stored at the AP device is in compliance with applicable regulations of the geographic region in which the AP device is operating (720). In scenarios where NMS 300 confirms compliance of the first version of the hardware compliance data stored at the AP device (YES branch of 730), NMS 300 verifies that the first version of the hardware compliance data stored at the AP device is in compliance with the applicable regulations of the geographic region (740).

In scenarios where NMS 300 determines that the first version of the hardware compliance data stored at the AP device is not in compliance with the applicable regulations of the geographic region in which the AP device is operating (NO branch of 730), NMS 300 retrieves a second version of the hardware compliance data that is in compliance with the applicable communication regulations of the geographic region (750). NMS 300 sends the second version of the hardware compliance data to the AP device for use when operating one or more hardware components of the AP device (760). In some examples, NMS 300 selects a primary AP device of the plurality of AP devices at the same site with which to initiate a peer-to-peer software update for the second version of the hardware compliance data. In other examples, NMS 300 sends a software update for the second version of the hardware compliance data to each AP device of the plurality of AP devices at the same site according to an upgrade schedule.

In one example, NMS 300 may initiate a data transfer to the AP device of the second version of the hardware compliance data that is in compliance with the applicable regulations of the geographic region of the AP device. In another example, NMS 300 may send, to the AP device, an indication that the first version of the hardware compliance data is not in compliance with the applicable regulations of the geographic region of the AP device. In response to the indication, NMS 300 may receive, from the AP device, a request for a data transfer of the second version of the hardware compliance data that is in compliance with the applicable regulations of the geographic region of the AP device. NMS 300 may receive an acknowledgement of receipt and/or successful installation of the second version of the hardware compliance data from the AP device (770).

In some examples, NMS 300 is configured to send to an administrator computing device a notification that each of the plurality of AP devices at the site has received the second version of the hardware compliance data. In further examples, NMS 300 may generate data representative of a user interface including an indication of a current version of the hardware compliance data stored at each of the plurality of AP devices.

FIGS. 8A and 8B illustrates an example power management table 800A and 800B, respectively. FIGS. 8A and 8B presents a partial list of power transmission information associated with AP device 142 or a particular group of AP devices 142-N associated with a particular site 102.

FIG. 8A illustrates power management information for power compliance in the United States for 2.4 GHz band devices. The power management table 800A includes, at least, channel information 814A, center frequency 816A in MHz for specific rates 812A. The power management table 800A may parse the power transmission information by spread spectrum protocol 818A. For example, Frequency Hopping Spread Spectrum (FHSS), Direct-Sequence Spread Spectrum (DSSS) and Orthogonal Frequency-Division Multiplexing (OFDM). The power management table 800A may parse the power transmission information by hardware-specific 820A wireless speeds (e.g., Wireless B, Wireless G, Wireless N, Wireless AC) and MIMO (multiple-input multiple-output) or SISO (single-input, single-output). The power transmission values 822A are in decibel-milliwatts (dBm). For example, element 822A-1 shows a power transmission value of 30.75 dBm at channel 3 with center frequency 2422 MHz having Wireless G speed for an OFDM spectral protocol. In another example, element 822A-12 shows a reduced power transmission value of 28.5 dBm at channel 11 with center frequency 2462 MHz. In yet another example, element 822A-N shows a power transmission value 'NS' at channel 12 with center frequency 2472 MHz. The 'NS' value is an abbreviation for 'No Service.' A channel with a 'NS' value may be disabled for transmitting and/or disabled for receiving operations. In this example, the power transmission information may be updated or modified due to a change and/or plurality of changes made by the US-regulatory agency. For example, element 822A-N may be modified due to a change in the US-regulations to the 2.4 GHz band. In an alternative example, all elements showing no service power transmission value for a channel having value of 'NS', as shown in channel 12 and 13, may be updated. In both examples, a new power management table for a US-based one or more APs 142 having 2.4-GHz compatibility is generated and stored at the NMS 130 for transmission to one or more APs 142 associated with a wireless network connected to the NMS 130.

FIG. 8B illustrates power management information for power compliance in the United States for 5- and 6-GHz devices. The power management table presents list of power transmission information for hardware-specific devices (e.g., 2.4 GHz, 5 GHz, or 6 GHz) in regulatory compliance with specific geographical regions or countries, (e.g., USA, EU, Israel, or Vietnam). The power management table 800B includes, at least, channel information 814B, center frequency 816B in MHz for specific rates 812B. The power management table 800B may parse the power transmission information by spread spectrum protocol 818B. For example, Frequency Hopping Spread Spectrum (FHSS), Direct-Sequence Spread Spectrum (DSSS) and Orthogonal Frequency-Division Multiplexing (OFDM). The power management table 800B may parse the power transmission information by hardware-specific wireless speeds (e.g., Wireless B, Wireless G, Wireless N, Wireless AC) and MIMO (multiple-input multiple-output) or SISO (single-input, single-output) 820B. The power transmission values 822B are in decibel-milliwatts (dBm). For example, element 822B-1 shows a power transmission value of 19.50 dBm at channel 185 with center frequency 6875 MHz. In another example, element 822B-N shows a no service power transmission value 'NS' at channel 2 with center frequency 5935 MHz. In this example, the power transmission information may be updated or modified due to a change and/or plurality of changes made by the US-regulatory agency to the 5- and 6-GHz band. For example, element 822B-N may be modified due to a change in the US-regulations. In an alternative example, all elements showing a no service power transmission value of 'NS', as shown in channel 2 having center frequency of 5935 MHz, may be updated. In both examples, a new power management table for a US-based one or more APs 142 having 5- and 6-GHz compatibility is generated and stored at the NMS 130 for transmission to one or more APs 142 associated with a wireless network connected to the NMS 130.

The power management table 800A and 800B illustrated in FIG. 8A and FIG. 8B, respectively, is converted into a readable format as part of a build process for storing the information onto NMS 130 and onto APs 142. For example, the power management table may begin as an EXCEL file, converted into XML format, and ultimately into a C-file as part of a build process. The power management table 800A and 800B may be stored in a kernel module that may be uploaded into the wireless network via NMS 130, as described.

Figure 9:
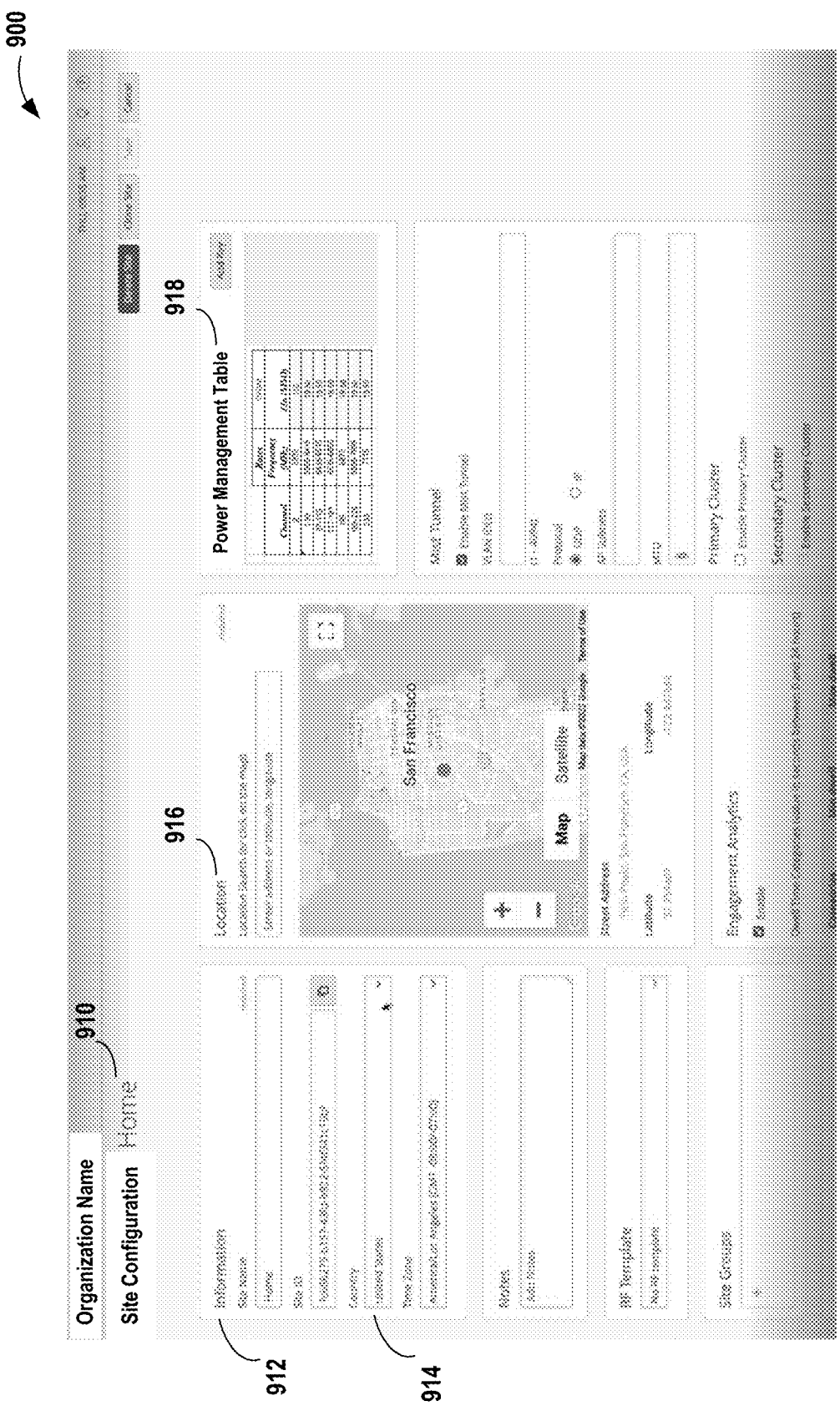
FIGS. 9, 10, and 11 illustrate example user interfaces generated by the network management system for display on a computing device of a network administrator to enable provisioning and management of power tables for APs, in accordance with the techniques of this disclosure.
Figure 10:
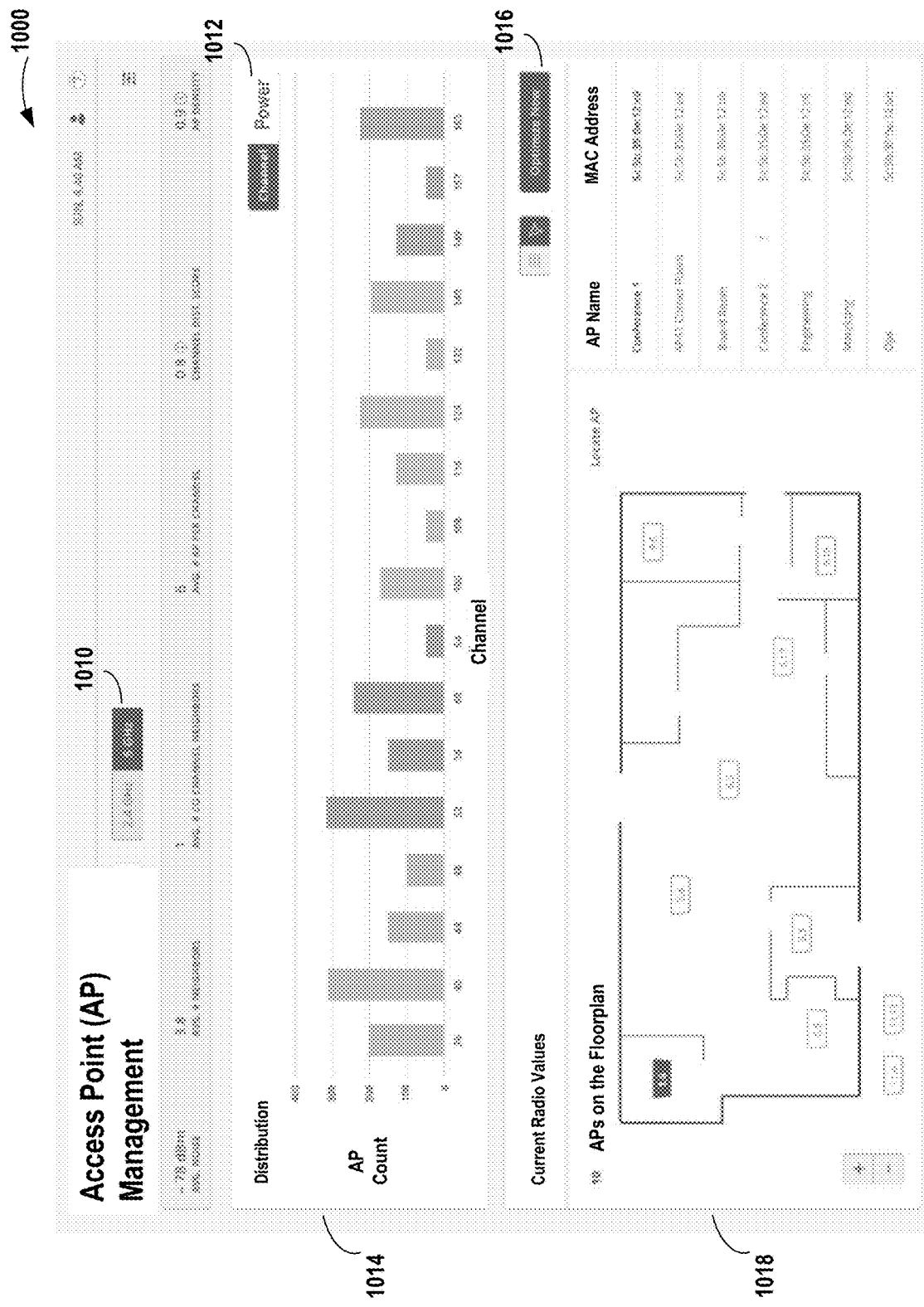
Figure 11:
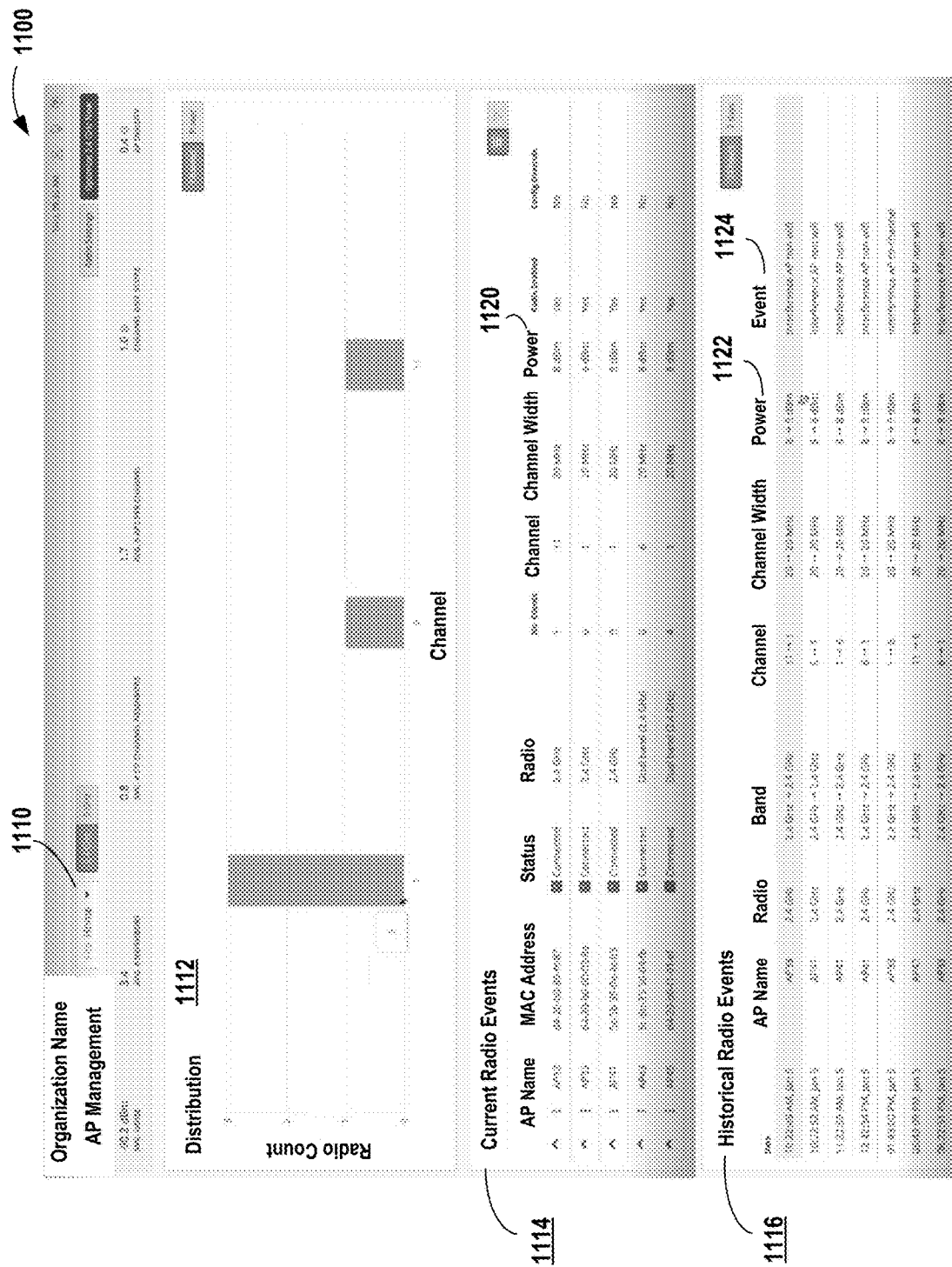

FIGS. 9, 10, and 11 illustrate example user interfaces generated by the network management system 130 for display on a computing device of a network administrator to enable hardware compliance for access point devices in accordance with the techniques of this disclosure.

FIG. 9 illustrates an example site configuration user interface 900 that presents network management information associated with NMS 130 for a plurality of AP devices 142-N associated with a particular wireless network 106. FIG. 9 illustrates a site configuration user interface 900 through which the network administrator may create wireless network site settings. User interface 900 includes site information 912 having site name and identification. User interface 900 includes country option portion 914 and time zone. User interface 900 includes location mapping 916 and power management information 918. Power management table 918 may change according to a change or update to country 914 or location 916. The power management table 918 may change according to AP device update (e.g., 2.4 GHz, 5 GHz, or 6 GHz).

FIG. 10 illustrates access points (APs) management user interface 1000 through which the network administrator may visualize the distribution of APs in the wireless network. The user interface includes distribution 1014 of APs across various channels and frequency bands. The distribution 1014 interface is capable of displaying the power information 1012 for the APs based on network administrator request. The user interface 1000 further includes a map or floorplan 1018 of APs positioned throughout a particular site (e.g., a store or floor of an office building) and those APs may support access to one or more wireless networks. In some examples, AP management user interface 1000 may further include an indication of a current version of the hardware compliance data stored at each of the APs within the particular site. In this example, the AP Management user interface 1000 displays the distribution of APs across various channels in the 5 GHz band. In another example, the AP Management user interface 1000 is capable of displaying the power information across all the APs within the 5 GHz band 1010 throughout the wireless network.

The "Optimize Now" button 1016 within the user interface 1000 may, when selected by the network administrator, initiate push-or-pull of power information from the cloud to all the AP devices in the wireless network. In an alternative example, the "Optimize Now" button 1016 may only be available when the NMS 130 is aware of one or more APs 142 have outdated hardware compliance data requiring an update. User interface 1000 presents multiple selectable options and multiple fillable fields to receive data used to configure a power management information for a particular AP device or group of AP devices, and user interface 1000 is not limited in scope as illustrated in FIG. 10.

FIG. 11 illustrates another detailed access point (AP) management user interface 1100 through which the network administrator may visualize the distribution 1112 of APs, along with the current radio events 1114 and historical radio events 1116 associated with each of the plurality of APs within the wireless network site 102. The distribution 1112 may illustrate the number of radio events across each channel. In an alternative example, distribution 1112 may illustrate the number of radio events across each power transmission. The current radio events 1114 may include, at least, AP name, MAC address, AP status, radio band information, channel and channel width information, and power information 1020. In some examples, the user interface 1100 may include historical radio events 1116 information to provide the network administrator visual information related to changes or updates made to the plurality of APs within the wireless network site 102. For example, an AP may have updated its channel information and would register as an event 1024 within the historical radio events 1016 portion of the user interface 1000. In another example, when the NMS pushes an up-to-date version of hardware compliance data to one or more APs, for example an updated power management table based on country-specific regulations, user interface 1100 may illustrate this as an event 1124 that recently occurred at the historical radio events 1016.

The techniques described herein may be implemented using software, hardware and/or a combination of software and hardware. Various examples are directed to apparatus, e.g., mobile nodes, mobile wireless terminals, base stations, e.g., access points, communications system. Various examples are also directed to methods, e.g., method of controlling and/or operating a communications device, e.g., wireless terminals (UEs), base stations, control nodes, access points and/or communications systems. Various examples are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of example approaches. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

In various examples devices and nodes described herein are implemented using one or more modules to perform the steps corresponding to one or more methods, for example, signal generation, transmitting, processing, and/or receiving steps. Thus, in some examples various features are implemented using modules. Such modules may be implemented using software, hardware or a combination of software and hardware. In some examples each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the steps of the above-described method(s). Some examples are directed to a device including a processor configured to implement one, multiple, or all of the steps of one or more methods of the one example aspect.

In some examples, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all examples are directed to a communications device, e.g., user equipment, with a processor which includes a module corresponding to each of the steps of the various described methods performed by the device in which the processor is included. In some but not all examples a communications device includes a module corresponding to each of the steps of the various described methods performed by the device in which the processor is included. The modules may be implemented purely in hardware, e.g., as circuits, or may be implemented using software and/or hardware or a combination of software and hardware.

Some examples are directed to a computer program product comprising a computer-readable medium comprising code for causing a computer, or multiple computers, to implement various functions, steps, acts and/or operations, e.g., one or more steps described above. In some examples, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various examples described above will be apparent to those skilled in the art in view of the above description. Such variations are to be considered within the scope of this disclosure. The methods and apparatus may be, and in various examples are, used with BLE, LTE, CDMA, orthogonal frequency division multiplexing (OFDM), and/or various other types of communications techniques which may be used to provide wireless communications links between access nodes and mobile nodes. In some examples the access nodes are implemented as base stations which establish communications links with user equipment devices, e.g., mobile nodes, using OFDM and/or CDMA. In various examples the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some examples. However, it will be understood by persons of ordinary skill in the art that some examples may be practiced without these specific details. In other instances, well-known methods, procedures, components, units and/or circuits have not been described in detail so as not to obscure the discussion.

Some examples may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some examples may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11 ac-2013, IEEE Standard for Information Technology-Telecommunications and Information Exchange Between Systems-Local and Metropolitan Area Networks-Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 December, 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some examples may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other examples may be used in various other devices, systems and/or networks.

Some demonstrative examples may be used in conjunction with a WLAN (Wireless Local Area Network), e.g., a Wi-Fi network. Other examples may be used in conjunction with any other suitable wireless communication network, for example, a wireless area network, a "piconet", a WPAN, a WVAN, and the like.

Some examples may be used in conjunction with a wireless communication network communicating over a frequency band of 2.4 Ghz, 5 GHz and/or 60 GHz. However, other examples may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although examples are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although examples are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The examples have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the examples illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including any communications channel(s)/elements/lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the examples described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The examples are described in relation to enhanced communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The example systems and methods are described in relation to IEEE 802.11 and/or Bluetooth® and/or Bluetooth® Low Energy transceivers and associated communication hardware, software, and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, it should be appreciated that changes to this sequence can occur without materially effecting the operation of the example(s). Additionally, the example techniques illustrated herein are not limited to the specifically illustrated examples but can also be utilized with the other examples and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols, and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® CortexTMM processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the examples is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed techniques may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there have at least been provided systems and methods for enhancing and improving conversational user interface. Many alternatives, modifications and variations would be or are apparent to those of ordinary skill in the applicable arts. Accordingly, this disclosure is intended to embrace all such alternatives, modifications, equivalents, and variations that are within the spirit and scope of this disclosure.

What is claimed is:

1. An access point (AP) device comprising:
    memory configured to store hardware compliance data; and
    one or more processors in communication with the memory and configured to:
        send, to a network management system (NMS) configured to manage a plurality of AP devices, including the AP device, that provide a wireless network at a site within a geographic region, a message including version information of the hardware compliance data currently stored at the AP device, wherein the version information indicates a first version of the hardware compliance data;
        based on the NMS determining that the first version of the hardware compliance data is not in compliance with applicable regulations of the geographic region of the AP device, receive, from the NMS, a second version of the hardware compliance data that is in compliance with the applicable regulations of the geographic region of the AP device;
        store the second version of the hardware compliance data in the memory; and
        enable operation of one or more hardware components of the AP device in accordance with the second version of the hardware compliance data.

2. The AP device of claim 1, wherein the hardware compliance data comprises a power management table.

3. The AP device of claim 1, wherein the hardware compliance data comprises radio calibration data.

4. The AP device of claim 1, wherein to send the message including the version information of the hardware compliance data, the one or more processors are configured to periodically send a message including network data and the version information of the hardware compliance data.

5. The AP device of claim 1, wherein to send the message including the version information of the hardware compliance data, the one or more processors are configured to, after each power on of the AP device, send an initial message including the version information of the hardware compliance data.

6. The AP device of claim 1, wherein to receive the second version of the hardware compliance data, the one or more processors are configured to receive the second version of the hardware compliance data as a data transfer initiated by the NMS based on the NMS determining that the first version of the hardware compliance data is not in compliance with the applicable regulations of the geographic region of the AP device.

7. The AP device of claim 1, wherein to receive the second version of the hardware compliance data, the one or more processors are configured to:
    receive, from the NMS, an indication that the first version of the hardware compliance data is not in compliance with the applicable regulations of the geographic region of the AP device; and
    based on the indication, initiate a data transfer from the NMS of the second version of the hardware compliance data that is in compliance with the applicable regulations of the geographic region of the AP device.

8. The AP device of claim 1, wherein the one or more processors are configured to, based on receipt of the second version of the hardware compliance data, digest the second version of the hardware compliance data for storage in the memory.

9. The AP device of claim 1, wherein to store the second version of the hardware compliance data, the one or more processors are configured to overwrite the first version of the hardware compliance data in the memory with the second version of the hardware compliance data.

10. A network management system (NMS) comprising:
    memory configured to store hardware compliance data; and
    one or more processors in communication with the memory and configured to:
        receive, from at least one AP device of a plurality of AP devices managed by the NMS that provide a wireless network at a site within a geographic region, a message including version information of the hardware compliance data currently stored at the at least one AP device;
        determine, based on the version information in the message, whether a first version of the hardware compliance data stored at the at least one AP device is in compliance with applicable regulations of the geographic region;
        when the first version of the hardware compliance data is not in compliance, retrieve, from the memory, a second version of the hardware compliance data that is in compliance with the applicable regulations of the geographic region; and
        send the second version of the hardware compliance data to the at least one AP device for use when operating one or more hardware components of the at least one AP device.

11. The NMS of claim 10, wherein the one or more processors are configured to send, to an administrator computing device, a notification that each of the plurality of AP devices at the site has received the second version of the hardware compliance data.

12. The NMS of claim 10, wherein the one or more processors are configured to generate data representative of a user interface including an indication of a current version of the hardware compliance data stored at each of the plurality of AP devices.

13. The NMS of claim 10, wherein to receive the message including the version information of the hardware compliance data, the one or more processors are configured to periodically receive a message including a package of statistical data and the version information of the hardware compliance data from the at least one AP device.

14. The NMS of claim 10, wherein to receive the message including the version information of the hardware compliance data, the one or more processors are configured to receive, after each power on of the at least one AP device, an initial message from the at least one AP device including the version information of the hardware compliance data.

15. The NMS of claim 10, wherein to send the second version of the hardware compliance data, the one or more processors are configured to initiate a data transfer to the at least one AP device of the second version of the hardware compliance data that is in compliance with the applicable regulations of the geographic region of the at least one AP device.

16. The NMS of claim 10, wherein to send the second version of the hardware compliance data, the one or more processors are configured to:
send, to the at least one AP device, an indication that the first version of the hardware compliance data is not in compliance with the applicable regulations of the geographic region of the at least one AP device; and
receive, from the at least one AP device, a request for a data transfer of the second version of the hardware compliance data that is in compliance with the applicable regulations of the geographic region of the at least one AP device.

17. The NMS of claim 10, wherein to send the second version of the hardware compliance data to the at least one AP device comprises selecting a primary AP device of the one or more AP devices with which to initiate a peer-to-peer software update for the second version of the hardware compliance data.

18. The NMS of claim 10, wherein to send the second version of the hardware compliance data to the at least one AP device comprises sending a software update for the second version of the hardware compliance data to each AP device of the plurality of AP devices according to an upgrade schedule.

19. A method comprising:
sending, by an access point (AP) device of a plurality of AP devices managed by a cloud-based network management system (NMS) and configured to provide a wireless network at a site within a geographic region, a message to the NMS including version information of hardware compliance data currently stored at the AP device, wherein the version information indicates a first version of the hardware compliance data;
based on the NMS determining that the first version of the hardware compliance data is not in compliance with applicable regulations of the geographic region of the AP device, receiving, by the AP device and from the NMS, a second version of the hardware compliance data that is in compliance with the applicable regulations of the geographic region of the AP device;
storing, by the AP device, the second version of the hardware compliance data; and
enabling, by the AP device, operation of one or more hardware components of the AP device in accordance with the second version of the hardware compliance data.

20. A method comprising:
receiving, by a network management system (NMS) configured to manage a plurality of access point (AP) devices that provide a wireless network at a site within a geographic region, a message from at least one AP device of the plurality of AP devices, the message including version information of hardware compliance data currently stored at the at least one AP device;
determining, by the NMS and based on the version information in the message, whether a first version of the hardware compliance data stored at the at least one AP device is in compliance with applicable regulations of the geographic region;
when the first version of the hardware compliance data is not in compliance, retrieving, by the NMS, a second version of the hardware compliance data that is in compliance with the applicable regulations of the geographic region; and
sending, by the NMS, the second version of the hardware compliance data to the at least one AP device for use when operating one or more hardware components of the at least one AP device.

* * * * *